(12) United States Patent
Bardeleben et al.

(10) Patent No.: US 12,181,227 B2
(45) Date of Patent: Dec. 31, 2024

(54) HEAT EXCHANGERS WITH INTEGRATED ELECTRICAL HEATING ELEMENTS AND WITH MULTIPLE FLUID FLOW PASSAGES

(71) Applicant: Dana Canada Corporation, Oakville (CA)

(72) Inventors: Michael J. R. Bardeleben, Oakville (CA); Nick Kalman, Hamilton (CA); Doug Vanderwees, Mississauga (CA); Silvio Tonellato, Hamilton (CA)

(73) Assignee: DANA CANADA CORPORATION, Oakville (CA)

( * ) Notice: Subject to any disclaimer, the term of this patent is extended or adjusted under 35 U.S.C. 154(b) by 1695 days.

(21) Appl. No.: 16/295,642

(22) Filed: Mar. 7, 2019

(65) Prior Publication Data

US 2019/0277578 A1     Sep. 12, 2019

Related U.S. Application Data

(60) Provisional application No. 62/752,035, filed on Oct. 29, 2018, provisional application No. 62/639,537, filed on Mar. 7, 2018.

(51) Int. Cl.
    *F28F 1/40*          (2006.01)
    *F28D 21/00*        (2006.01)
    (Continued)

(52) U.S. Cl.
    CPC ............ *F28F 1/40* (2013.01); *F28D 21/0003* (2013.01); *F28F 3/04* (2013.01); *F28F 13/12* (2013.01); *H01M 50/204* (2021.01); *F28F 13/02* (2013.01)

(58) Field of Classification Search
    CPC ...... F28F 1/40; F28F 3/04; F28F 13/12; F28F 3/025; F28F 3/046; F28F 3/06;
    (Continued)

(56) References Cited

U.S. PATENT DOCUMENTS 3,578,952 A     5/1971   Boose
4,688,631 A *   8/1987   Peze ..................... F28D 9/0037
                                                           29/890.039

(Continued)

FOREIGN PATENT DOCUMENTS

CA         2260890         8/2000
EP         0065686 A2 *   12/1982

(Continued)

OTHER PUBLICATIONS

Canadian Intellectual Property Office, International Search Report and Written Opinion in Application No. PCT/CA2019/050282, dated Jun. 5, 2019, 9 pages, Gatineau, Quebec, Canada.

*Primary Examiner* — Harry E Arant
(74) *Attorney, Agent, or Firm* — McCoy Russell LLP

(57) ABSTRACT

A heat exchanger has at least one channel structure defining a fluid flow passage. Each channel structure includes first and second thermally conductive plates, with a fluid flow passage defined by a space between the inner surfaces of the first and second plates. At least one electrical heating element is provided outside the fluid flow passage and located adjacent to the outer surface of the first plate, such that heat from the heating element is transferred through the first plate to the fluid in the flow passage during use of the heat exchanger. In some embodiments, the first plate of the first channel structure is arranged opposite to the first plate of the second channel structure, with spacers received between the first and second channel structures. At least one of the spacers may have fluid transfer openings to provide flow communication between the first and second channel structures.

25 Claims, 17 Drawing Sheets

(51) Int. Cl.
  *F28F 3/04*  (2006.01)
  *F28F 13/12*  (2006.01)
  *H01M 50/204*  (2021.01)
  *F28F 13/02*  (2006.01)

(58) Field of Classification Search
  CPC .... F28D 21/00; F28D 1/0308; F28D 21/0003; F28D 1/0333; F28D 1/035; F28D 2021/0029; F28D 2021/0043; H01M 10/625; H01M 10/615; H01M 10/6556; H01M 10/6551
  See application file for complete search history.

(56) References Cited

U.S. PATENT DOCUMENTS

| | | | |
|---|---|---|---|
| 5,640,850 | A | 6/1997 | Benckert |
| 5,640,852 | A | 6/1997 | Atlas |
| RE35,890 | E | 9/1998 | So |
| 5,995,711 | A | 11/1999 | Fukuoka |
| 6,093,909 | A | 7/2000 | Beetz |
| 6,178,292 | B1 | 1/2001 | Fukuoka |
| 6,273,183 | B1 | 8/2001 | So |
| 6,911,631 | B2 | 6/2005 | Nilsson |
| 7,158,719 | B2 | 1/2007 | Cassidy |
| 7,581,698 | B2 | 9/2009 | Hoehne |
| 8,653,423 | B2 | 2/2014 | Olding |
| 9,375,993 | B2 | 6/2016 | Bytzek |
| 9,515,357 | B2 | 12/2016 | Haskins |
| 9,527,403 | B2 | 12/2016 | Mardall |
| 9,694,649 | B2 | 7/2017 | Seiler |
| 9,799,932 | B2 | 10/2017 | Haskins |
| 9,854,626 | B2 | 12/2017 | Deenen |
| 9,895,957 | B2 | 2/2018 | Eckert |
| D813,363 | S | 3/2018 | Eckert |
| 9,958,216 | B2 | 5/2018 | Schmid |
| 10,109,897 | B2 | 10/2018 | Haskins |
| 2002/0026999 | A1* | 3/2002 | Wu ............ F28D 9/005 165/167 |
| 2010/0046934 | A1 | 2/2010 | Johnson |
| 2012/0247716 | A1 | 10/2012 | Galtz |
| 2012/0282506 | A1 | 11/2012 | Hohenthanner |
| 2013/0186885 | A1 | 7/2013 | Hoffstaedter |
| 2014/0234482 | A1* | 8/2014 | Kempfert ............ C12C 13/10 99/278 |
| 2015/0014295 | A1 | 1/2015 | Bytzek |
| 2015/0117847 | A1 | 4/2015 | Reinholz |
| 2015/0362267 | A1 | 12/2015 | Leuthner |
| 2016/0020496 | A1 | 1/2016 | Burrows |
| 2017/0096073 | A1 | 4/2017 | Mardall |
| 2017/0138633 | A1 | 5/2017 | Hermida Domínguez |
| 2017/0176108 | A1* | 6/2017 | Palanchon ......... H01M 10/613 |
| 2017/0176516 | A1* | 6/2017 | Mamodia ............ H05B 3/267 |
| 2017/0214008 | A9 | 7/2017 | Mardall |
| 2017/0313160 | A1 | 11/2017 | Eckert |
| 2018/0152990 | A1 | 5/2018 | Klinkmüller |
| 2018/0297450 | A1 | 10/2018 | Schriek |

FOREIGN PATENT DOCUMENTS

| | | | |
|---|---|---|---|
| WO | WO-2013114846 A1 * | 8/2013 | ............ E03D 9/08 |
| WO | 2014206951 | 12/2014 | |
| WO | 2015113161 | 8/2015 | |
| WO | 2016066601 | 5/2016 | |
| WO | 2016095804 | 6/2016 | |
| WO | WO-2016095804 A1 * | 6/2016 | ............ F24H 1/10 |
| WO | 2017140606 | 8/2017 | |
| WO | 2017140608 | 8/2017 | |
| WO | 2017140668 | 8/2017 | |
| WO | 2018065548 | 4/2018 | |
| WO | 2018171838 | 9/2018 | |
| WO | 2018172310 | 9/2018 | |
| WO | 2018172509 | 9/2018 | |
| WO | 2018215623 | 11/2018 | |

\* cited by examiner

HEAT EXCHANGERS WITH INTEGRATED ELECTRICAL HEATING ELEMENTS AND WITH MULTIPLE FLUID FLOW PASSAGES

CROSS-REFERENCE TO RELATED APPLICATIONS

This application claims priority to and the benefit of U.S. Provisional Patent Application No. 62/639,537 filed Mar. 7, 2018; and U.S. Provisional Patent Application No. 62/752,035 filed Oct. 29, 2018; the contents of which are incorporated herein by reference.

TECHNICAL FIELD

The present disclosure relates to heat exchangers for vehicles, such as a battery electric vehicle (BEV) and hybrid electric vehicles (HEV), and particularly to heat exchangers having multiple fluid flow passages with electrical heating elements provided on their outer surfaces for rapidly heating a fluid inside the flow channels.

BACKGROUND

In a conventional vehicle having an internal combustion engine, large amounts of waste heat are generated by the engine. Some of this waste heat can be recovered from the vehicle exhaust gases and/or the cooling system and used in various ways. For example, coolant heated by the engine can be used to provide heated air for heating the passenger cabin. Also, waste heat recovered from the coolant and/or the exhaust gas can be used by the vehicle's active warm-up (AWU) system to warm system components such as the engine, transmission and axle by directly or indirectly heating the oil and/or a coolant circulating through these components with a heat exchanger, to quickly bring these components and/or fluids to their optimal operating temperatures under start-up conditions.

Because waste heat from an internal combustion engine is not available in BEVs, and is of limited availability in HEVs, alternate heat sources are necessary or at least desirable to provide heat for passenger cabin heating and for the AWU system.

In addition, a key limitation of lithium-ion battery systems, such as those used in BEVs and HEVs, is that the battery cannot be reliably operated or charged at temperatures much below 0° C., and especially below −5° C. Ideally the battery should be brought to a temperature of about 5-20° C. as quickly as possible from a cold start. Until it reaches this temperature, the battery has limited power capacity, and the battery can be damaged by attempting to charge or discharge it at temperatures below this range.

The benefits gained by heating the battery may be at least partially offset by the energy required to energize and pump the heat transfer fluid through the heat exchanger(s), because this energy must typically be provided by the battery.

In order to save space and minimize cost and complexity, it is generally desirable to integrate components of the vehicle heat/cooling system wherever possible. For example, although it is known to integrate a heating element into a fluid heating device, there are a number of technical problems which have limited the effective integration of surface film heating technology with fluid heating devices for vehicular applications.

Therefore, there is a need for heat exchangers capable of heating and optionally cooling batteries in BEVs and HEVs, while minimizing parasitic energy losses caused by such heat exchangers, and minimizing the number of added vehicle components.

SUMMARY

In accordance with an aspect of the present disclosure, there is provided a heat exchanger having an inlet and an outlet, and comprising a first channel structure and a first electrical heating element.

According to an aspect, the first channel structure defines a first fluid flow passage and comprises a first plate, a second plate and a first fluid flow passage. Each of the first and second plates has an inner surface facing inwardly toward the first fluid flow passage, and an opposed outer surface facing outwardly away from the first fluid flow passage. The first fluid flow passage is defined by a space between the inner surfaces of the first and second plates.

According to an aspect, the first and second plates are comprised of aluminum.

According to an aspect, the first electrical heating element is located outside the fluid flow passage and adjacent to the outer surface of the first plate of the first channel structure, such that heat produced by the first electrical heating element is transferred through the first plate to the fluid in the first fluid flow passage during use of the heat exchanger.

According to an aspect, the first electrical heating element has a thickness from about 1 µm to about 1000 µm.

According to an aspect, the first electrical heating element comprises an electrically insulating dielectric base layer which is closest to the outer surface of the first plate, and an electrically resistive heater layer on the dielectric layer.

According to an aspect, the dielectric base layer comprises a thermally conductive, electrically insulating composite layer comprising a polymer mixed with a particulate filler material.

According to an aspect, the dielectric base layer is in direct contact with and thermally bonded directly to the outer surface of the first plate.

According to an aspect, at least one of the first plate and the second plate comprises a shaped plate having a generally flat, planar base surrounded on all sides by a raised peripheral sidewall having a planar flange defining a sealing surface along which the raised peripheral flange is sealingly secured to the opposing one of the first and second plates.

According to an aspect, the first plate is substantially completely flat and the second plate is a shaped plate.

According to an aspect, the heat exchanger further comprises a turbulence-enhancing insert provided in the first fluid flow passage of the first channel structure, the turbulence-enhancing insert comprising a corrugated fin or a turbulizer having ridges connected by side walls, wherein a first plurality of the ridges is in contact with and metallurgically bonded to the inner surface of the first plate.

According to an aspect, the heat exchanger further comprises at least one heat sink plate having an inner surface which is fixed to the outer surface of the first plate by a metallurgical bond, and an outer surface to which the first electrical heating element is directly applied with the dielectric base layer of the first electrical heating element in direct contact with and thermally bonded directly to the outer surface of the heat sink plate.

According to an aspect, the second plate comprises a shaped plate having a generally flat, planar base surrounded on all sides by a raised peripheral sidewall having a planar flange defining a sealing surface along which the raised peripheral flange is sealingly secured to the first plate.

According to an aspect, the second plate has a plurality of protrusions formed in the flat, planar base thereof, the protrusions having a height which is the same as a height of the raised peripheral flange, each protrusion having a sealing surface which is co-planar with the planar sealing surface of the peripheral flange.

According to an aspect, the sealing surfaces of the protrusions are metallurgically bonded to the inner surface of the first plate.

According to an aspect, the protrusions comprise ribs and/or dimples.

According to an aspect, the heat exchanger further comprises a second channel structure defining a second fluid flow passage, and a second electrical heating element.

According to an aspect, the second channel structure comprises a first plate, a second plate and a second fluid flow passage.

According to an aspect, the second fluid flow passage is defined by a space between the inner surfaces of the first and second plates of the second channel structure.

According to an aspect, the first and second plates of the second channel structure are comprised of aluminum.

According to an aspect, each of the first and second plates of the second channel structure has an inner surface facing inwardly toward the second fluid flow passage, and an opposed outer surface facing outwardly away from the second fluid flow passage.

According to an aspect, the second electrical heating element is located outside the second fluid flow passage and adjacent to the outer surface of the first plate of the second channel structure, such that heat produced by the second electrical heating element is transferred through the first plate of the second channel structure to the fluid in the second fluid flow passage during use of the heat exchanger.

According to an aspect, the second electrical heating element has a thickness from about 1 µm to about 1000 µm.

According to an aspect, the second electrical heating element comprises an electrically insulating dielectric base layer which is closest to the outer surface of the second plate, and an electrically resistive heater layer on the dielectric layer.

According to an aspect, the dielectric base layer of the second electrical heating element comprises a thermally conductive, electrically insulating composite layer comprising a polymer mixed with a particulate filler material.

According to an aspect, the inlet of the heat exchanger is in flow communication with the first fluid flow passage, and the outlet of the heat exchanger is in flow communication with the second fluid flow passage.

According to an aspect, the first plate of the first channel structure is in opposed, facing relation to the first plate of the second channel structure, and spaced apart therefrom by a gap.

According to an aspect, the first and second electrical heating elements are spaced apart and in opposed, facing relation to one another inside the gap.

According to an aspect, the heat exchanger further comprises a first spacer which is received between the first plate of the first channel structure and the first plate of the second channel structure, the first spacer having at least one fluid transfer opening providing flow communication between the first and second fluid flow passages through fluid openings in the first plates of the first and second channel structures which are aligned with the at least one fluid transfer opening of the first spacer.

According to an aspect, the first spacer has first and second surfaces which are sealingly engaged with the first plates of the first and second channel structures.

According to an aspect, the heat exchanger further comprises a mechanical sealing element providing a mechanical seal between the first spacer and the first plates of the first and second channel structures.

According to an aspect, the heat exchanger further comprises a second spacer which is received between the first plate of the first channel structure and the first plate of the second channel structure, the second spacer having first and second surfaces which are engaged with the first plates of the first and second channel structures.

According to an aspect, the second spacer is located along an edge of the heat exchanger along which the inlet and outlet are located.

According to an aspect, the first spacer is located along an opposite edge of the heat exchanger, which is remote from the inlet and the outlet.

According to an aspect, the first and second spacers have a thickness equal to the height of the gap.

According to an aspect, the first and second electrical heating elements are located with the gap between the first and second spacers.

According to an aspect, the second spacer has at least one fluid transfer opening providing flow communication between the second fluid flow passage and the outlet through a fluid opening in the first plate of the first channel structure, and through a fluid opening in the first plate of the second channel structure which is outside the area of the second fluid flow passage.

According to an aspect, the heat exchanger further comprises a mechanical sealing element providing a mechanical seal between the first spacer and the first plates of the first and second channel structures.

According to an aspect, the space between the inner surfaces of the first and second plates further defines a second fluid flow passage; wherein the inlet is in flow communication with the first fluid flow passage, and the outlet is in flow communication with the second fluid flow passage, the inlet and outlet being spaced apart from one another and located along a first edge of the heat exchanger.

According to an aspect, the first and second fluid flow passages are separated from one another by a first dividing rib, with communication between the first and second flow passages being provided at a gap located at a terminal end of the first dividing rib, the gap being located proximate to a second edge of the heat exchanger, so as to provide a U-flow configuration through the first and second fluid flow passages.

According to an aspect, the first electrical heating element is located adjacent to the outer surface of the first plate of the first channel structure.

According to an aspect, the heat exchanger further comprises a second electrical heating element located outside the first and second fluid flow passages and adjacent to the outer surface of the second plate of the first channel structure, such that heat produced by the second electrical heating element is transferred through the first plate of the first channel structure to the fluid in the first and second fluid flow passages during use of the heat exchanger.

According to an aspect, the heat exchanger further comprises a second channel structure defining a second fluid flow passage; wherein the second channel structure comprises a first plate and a second plate; each of the first and second plates of the second channel structure has an inner surface facing inwardly toward the second fluid flow passage, and an opposed outer surface facing outwardly away from the second fluid flow passage; and the second fluid flow passage is defined by a space between the inner surfaces of the first and second plates of the second channel structure.

According to an aspect, the first and second plates of the second channel structure are comprised of aluminum.

According to an aspect, the outer surface of the second plate of the first channel structure is secured to the outer surface of the second plate of the second channel structure.

According to an aspect, the first and second channel structures each define a portion of the first fluid flow passage, and a portion of the second fluid flow passage.

According to an aspect, the portions of the first fluid flow passage defined by the first and second channel structures are connected together by an inlet manifold defined by aligned inlet manifold openings in the second plates of the first and second channel structures proximate to the inlet.

According to an aspect, the portions of the second fluid flow passage defined by the first and second channel structures are connected together by an outlet manifold defined by aligned outlet manifold openings in the second plates of the of the first and second channel structures proximate to the outlet.

According to an aspect, the heat exchanger further comprises a second dividing rib in the second channel structure to separating the portions of the first and second fluid flow passages in the second channel structure from one another, with communication between the first and second flow passages being provided at a gap located at a terminal end of the second dividing rib, the gap being located proximate to a second edge of the heat exchanger, so as to provide a U-flow configuration through the first and second fluid flow passages.

According to an aspect, the inlet comprises an opening in the first plate of the first or second channel structure which is in flow communication with the inlet manifold, and the outlet comprises an opening in the first plate of the first or second channel structure which is in flow communication with the outlet manifold.

According to an aspect, the heat exchanger further comprises a second electrical heating element located outside the first and second fluid flow passages and adjacent to the outer surface of the first plate of the second channel structure, such that heat produced by the second electrical heating element is transferred through the first plate of the second channel structure to the fluid in the first and second fluid flow passages during use of the heat exchanger.

According to an aspect, the heat exchanger further comprises a second channel structure comprising a first plate, a second plate and a second fluid flow passage; wherein the second fluid flow passage is defined by a space between the inner surfaces of the first and second plates of the second channel structure; wherein the outer surface of the second plate of the first channel structure is secured to the outer surface of the second plate of the second channel structure.

According to an aspect, the inlet is in flow communication with the first fluid flow passage, and the outlet is in flow communication with the second fluid flow passage, and the inlet and outlet are located proximate to a first edge of the heat exchanger.

According to an aspect, a communication opening is provided through the second plates proximate to a second edge of the heat exchanger which is remote from the first edge, the communication opening providing flow communication between the first and second fluid flow passages.

According to an aspect, the second plate of the first channel structure is integrally formed with the second plate of the second channel structure.

According to an aspect, the heat exchanger further comprises a second electrical heating element located outside the first and second fluid flow passages and adjacent to the outer surface of the first plate of the second channel structure, such that heat produced by the second electrical heating element is transferred through the first plate of the second channel structure to the fluid in the second fluid flow passage during use of the heat exchanger.

According to an aspect, the first and second channel structures each comprise: a shaped first plate having a generally flat, planar base surrounded on all sides by a raised peripheral sidewall having a planar flange defining a sealing surface along which the raised peripheral flange is sealingly secured to a sealing surface of the opposed second plate; and a substantially completely flat second plate.

According to an aspect, the heat exchanger further comprises a protective cover having a top which is spaced from the electrical heating element, and a bottom flange by which the cover is sealed to the outer surface of the first plate, around the outer periphery of the at least one electrical heating element.

According to an aspect, the heat exchanger further comprises a resilient sealing gasket between the bottom flange and the outer surface of the first plate.

According to an aspect, the cover further comprises a plurality of foldable tabs, each of the tabs having one edge secured to the bottom flange, the tabs being folded downwardly and inwardly around outer edges of the first and second plates.

According to an aspect, the heat exchanger further comprises a high voltage connector mounted over a hole in the cover, and being connected to high voltage leads of the electrical heating element.

According to an aspect, the heat exchanger comprises a fluid heater for indirect heating of one or more vehicle components which are remote from heat exchanger.

According to an aspect, at least one of the first electrical heating element and the second electrical heating element has a flat outer surface adapted for thermal contact with one or more vehicle components, for direct heating of the one or more vehicle components.

According to an aspect, the flat outer surface of at least one of the first electrical heating element and the second electrical heating element is adapted to support one or more vehicle components; and wherein the one or more vehicle components comprise one or more battery cells or battery modules of a rechargeable lithium-ion battery for a vehicle.

According to an aspect, each of the first and second electrical heating elements further comprises an electrically insulating dielectric top layer which defines the flat outer surface of the electrical heating element.

BRIEF DESCRIPTION OF THE DRAWINGS

Exemplary embodiments of the present disclosure will now be described, by way of example, with reference to the accompanying drawings, in which.

DETAILED DESCRIPTION

Figure 1:
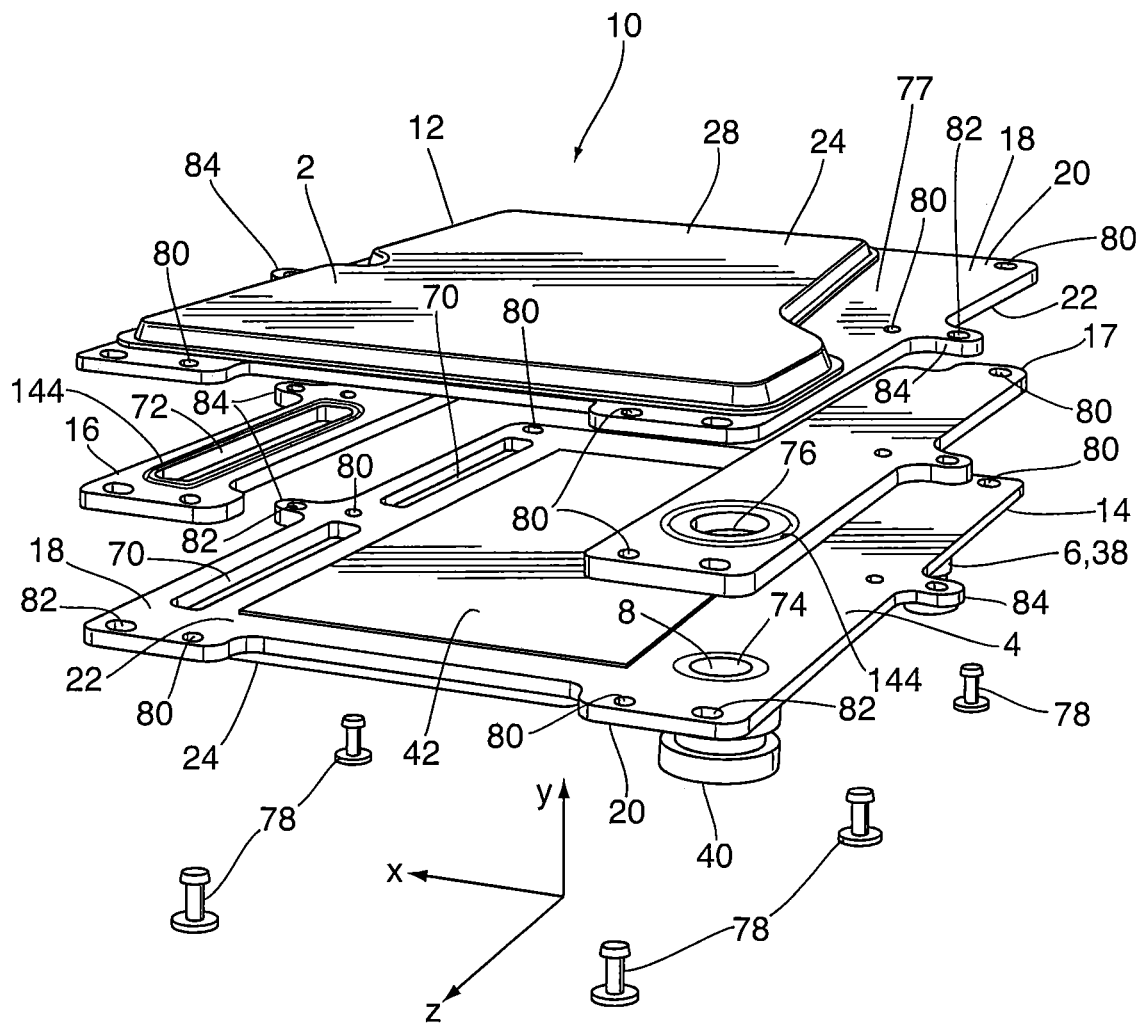
FIG. 1 is a perspective view of a multi-channel heat exchanger according to a first embodiment, in a partly disassembled state.

A multi-channel heat exchanger 10 according to a first embodiment is shown in FIGS. 1 to 3C. Heat exchanger 10 generally comprises a first channel structure 12 defining a first fluid flow passage 2, a second channel structure 14 defining a second fluid flow passage 4, a first spacer 16 and a second spacer 17. The heat exchanger 10 includes an inlet port 6 provided with an inlet fitting 38 and an outlet port 8 provided with an outlet fitting 40, wherein the fittings connect the heat exchanger 10 to one or more components of a fluid circulation system (not shown). For example, the fluid to be circulated through heat exchanger 10 may be a coolant, with the inlet and outlet fittings 38, 40 being connected to a coolant circulation system which includes one or more components to which heated coolant from heat exchanger 10 is to be supplied.

In the present embodiment, both ports 6, 8 and fittings 38, 40 are attached to the second (lower) channel structure 14, however, it will be appreciated that the locations of ports 6, 8 and fittings 38, 40 are variable and are subject to application-specific packaging considerations.

The first and second channel structures 12, 14 of heat exchanger 10 are shown in the drawings as generally rectangular structures, each comprising a first plate 18 and a second plate 24 which are in opposed facing relation to one another. The plates 18, 24 are thermally conductive and each have an inner surface facing inwardly toward the fluid flow passage 2 or 4 and an outer surface facing outwardly away from the fluid flow passage 2 or 4. More specifically, first plate 18 has inner surface 20 and an outer surface 22, and second plate 24 has an inner surface 26 and an outer surface 28.

Each fluid flow passage 2 or 4 is defined by a space between the inner surfaces 20, 26 of the first and second plates 18, 24. The first and second plates 18, 24 are sealed together at their peripheral edges, thereby sealing the edges of the fluid flow passage 2 or 4, and areas of the first and second plates 18, 24 located inwardly of the peripheral edges are spaced apart to define the fluid flow passage 2 or 4.

In the present embodiment, the first plate 18 is substantially completely flat and planar, with the inner and outer surfaces 20, 22 both being flat and planar. The second plate 24 is shaped, for example by stamping or drawing, such that it has a generally flat, planar base 30 surrounded on all sides by a raised peripheral sidewall 32 extending from the base 30 to a planar flange 34 on the inner surface 26, the planar flange 34 defining a sealing surface (sometimes referred to herein as "sealing surface 34") which is sealed to a planar, peripheral sealing surface 36 on the inner surface 20 of first plate 18, for example by brazing or welding. It can be seen that the shaping of the second plate 24 in the present embodiment provides the space between the first and second plates 18, 24 in which the fluid flow passage 2 or 4 is provided, with the height of the fluid flow passage 2 or 4 being defined by a height difference between the base 30 of second plate 24 and the sealing surface of the planar flange 34.

The first and second plates 18, 24 of the first and second channel structures 12, 14 may be comprised of aluminum or alloys thereof, and may be joined together by brazing in a brazing oven. In the following description and claims, any references to aluminum are to be understood as including aluminum alloys, such as 3000 series alloys. In order to facilitate brazing, a braze filler metal is provided between the surfaces being joined. The braze filler metal may be provided as a clad layer on the sealing surfaces 34, 36 of the first plate 18 and/or the second plate 24, a shim interposed between sealing surfaces 34, 36, and/or a layer of clad brazing sheet interposed between sealing surfaces 34, 36. Thus, surfaces 34, 36 may not be in direct contact with one another, but rather may be sealed together through a layer of brazing filler metal and/or a brazing sheet, which are not shown in the drawings.

Although the first and second plates 18, 24 are shown as having the same or similar thickness, the first plate 18 may comprise a heat sink having a thickness which is greater than that of the second plate 24, sufficient to provide a heat dissipating, temperature spreading function.

Each of the channel structures 12, 14 of heat exchanger 10 is provided with an electrical heating element 42 provided outside the fluid flow passage 2 or 4 and located adjacent to the outer surface 20 of the first plate 18, such that heat produced by the electrical heating element 42 is transferred through the first plate 18 to the fluid in the fluid flow passage 2 or 4 during use of heat exchanger 10. As can be seen from the drawings, for example in FIG. 3A, the electrical heating element 42 provided on the first channel structure 12 is in opposed facing relation to the electrical heating element 42 of the second channel structure 14, such that the two heating elements 42 are spaced apart by a distance which is equal to the height of the spacers 16, 17 (less the thickness of the heating elements 42 themselves). It can be seen that this arrangement protects the heating elements 42 against damage.

Each electrical heating element 42 may comprise a surface film heater comprising one or more layers. The heating element 42 will typically include at least one layer of conductive material and at least one layer of a resistive material, wherein the conductive material supplies an electric current to the resistive material, which converts the electric current into heat energy.

Figure 3:
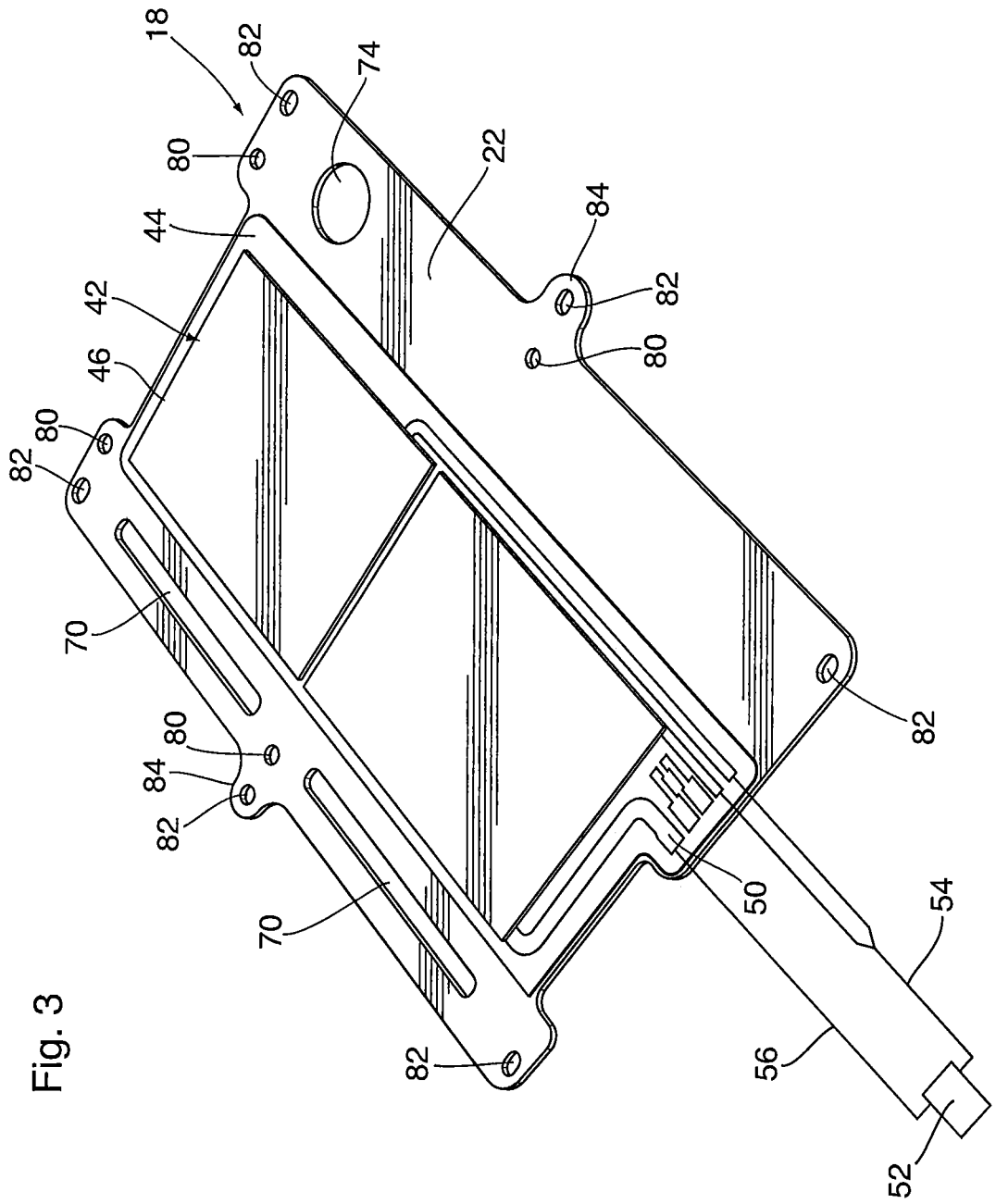
FIG. 3 is a perspective view of one of the plates of FIG. 2.
Figure 3A:
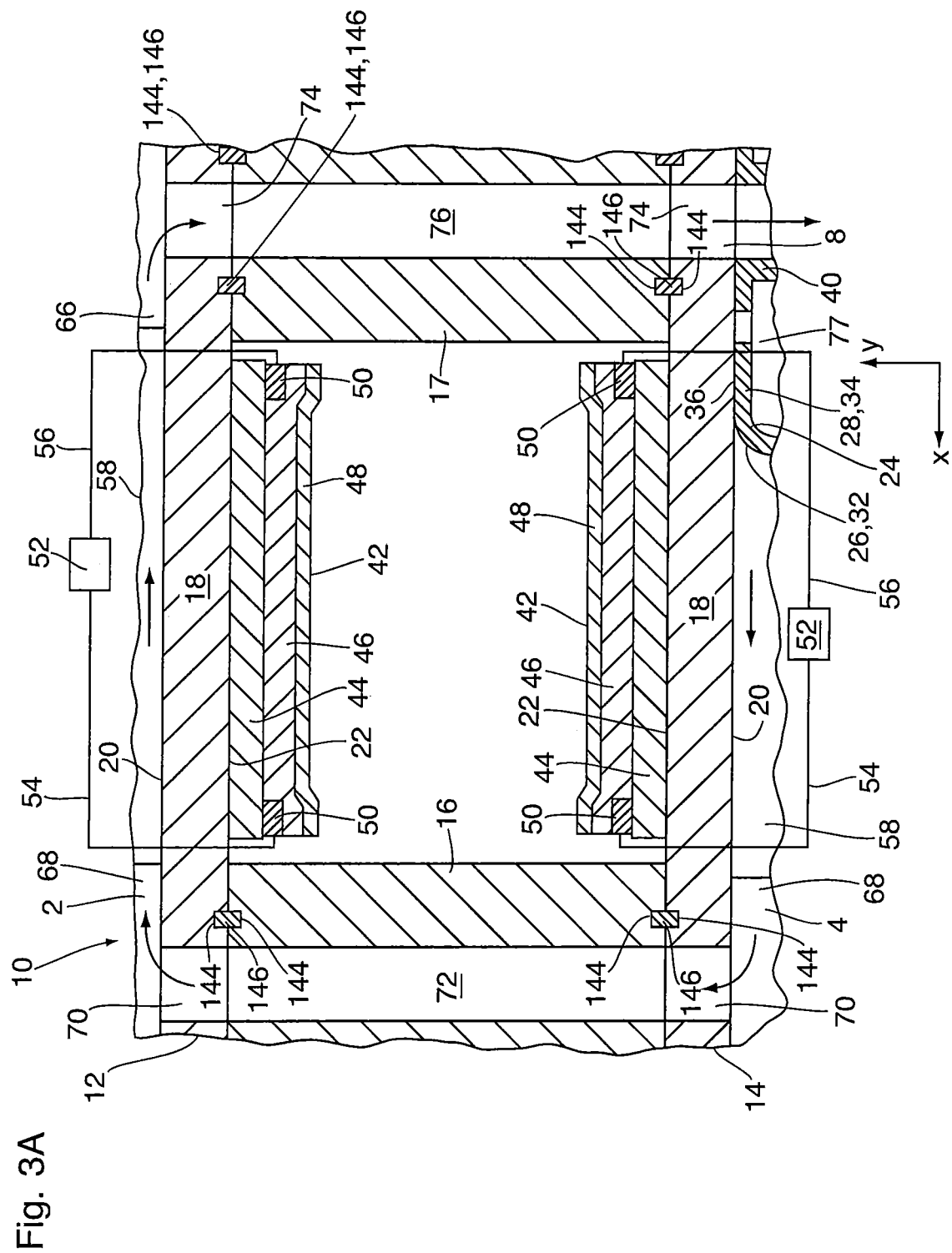
FIG. 3A is a schematic, partial cross-section in the x-y plane through the heat exchanger of FIG. 1.

Various types of surface film heaters can be used as the first electrical heating element 42. In embodiments where the heat exchanger 10 is comprised of aluminum, it is desirable that the first electrical heating element 42 comprises a surface film heater which is capable of bonding directly to an aluminum substrate. For example, as shown in FIG. 3A, electrical heating element 42 may comprise an electrically insulating dielectric base layer 44 which is closest to the outer surface 22 of first plate 18; an electrically resistive heater layer 46 on the dielectric layer 44; an electrically insulating dielectric top layer 48 (or topcoat) on the resistive heater layer 46; and an electrically conductive layer 50 comprising one or more conductive strips/buss bars. The conductive layer 50 is in direct contact with the resistive heater layer 46 and the conductive strips comprising conductive layer 50 are shown in FIG. 3A as being located under the longitudinal edges of the resistive heater layer 46, between the resistive heater layer 46 and the dielectric base layer 44. However, it will be appreciated that the conductive layer 50 may instead be located on the resistive heater layer 46, between the resistive heater layer 46 and the dielectric top layer 48.

Surface film heaters having the above-described structure of the first electrical heating element 42 can be applied to an aluminum substrate by deposition of several successive layers using techniques such as screen printing. The first electrical heating element may typically have a thickness from about 1 μm to about 1000 μm. For example, the electrical heating element 42 may have a thickness of from about 1 μm to about 700 μm, or from about 150 μm to about 600 μm, or from about 250 μm to about 500 μm, for example from about 250 μm to about 300 μm. Surface film heaters having this layered structure and this range of thicknesses are sometimes referred to as "thick film" heaters. The term "thick film" as used herein refers to coatings that in general are >1 μm in thickness. While the terms "thick film" and "thin film" are relative, in the coatings industry, "thin film" generally refers to technologies using nano or submicron thick coatings which are applied by techniques which may lay down atomic thick layers of the coating. Thick film coatings on the other hand are deposited in one or more successive layers using techniques such as screen printing.

Surface film heating elements such as thick film heat elements are advantageous for vehicle applications because they provide versatile designs, high power densities, uniform heat, and rapid heating and cooling. In addition, such heating elements are low-profile and lightweight. In particular, the inventors have found that surface film heating elements are effective for direct heating of vehicle components to be heated, such as rechargeable lithium-ion batteries as used in BEVs and HEVs, and/or for indirect heating of vehicle components (including the passenger cabin) by heating a fluid which transfers heat to these vehicle components. Further, when a surface film heating element is integrated with a heat exchanger, as described herein, the inventors have found that the same heat exchanger which is used for direct or indirect heating of vehicle components with the heating element activated, may be used for direct or indirect cooling of vehicle components with the heating element de-activated.

Where the plates 18, 24 comprising the heat exchanger 10 are comprised of aluminum, the processing temperatures for applying and/or curing the coatings making up the electrical heating element 42 have an upper limit of about 600° C., because aluminum has a relatively low melting temperature of about 660° C., with alloys such as 3000 series alloys having somewhat lower melting temperatures. The electrical heating element 42 may withstand temperatures as high as about 500° C.

The dielectric base layer 44 is directly applied to an external surface of the heat exchanger 10 and thermally processed at temperatures below 600° C., for example in the range from about 400 to about 450° C. Thermal processing may be performed in air using a conventional furnace or IR heating, and results in bonding of the dielectric base layer 44 to the aluminum substrate, referred to herein as a "thermal bond".

In addition to having a low melting temperature, aluminum has a relatively high coefficient of thermal expansion. Where the dielectric base layer 44 has a coefficient of thermal expansion which is significantly different from that of the aluminum comprising heat exchanger 10, the dielectric base layer 44 can crack and/or become disbonded from the heat exchanger 10 during thermal cycling of the heat exchanger 10 and/or the electrical heating element 42. Due to these limitations, conventional insulating layers comprised of glass enamel are not suitable for such applications, since they are typically applied and/or cured at temperatures above the melting temperature of aluminum, and have lower coefficients of thermal expansion than aluminum.

The dielectric base layer 44 of electrical heating element 42 is comprised of a material having processing and melting temperatures less than 600° C.; having a relatively high coefficient of thermal expansion to match that of aluminum; and having suitable electrical insulation properties under thermal cycling of up to about 250° C. For example, the dielectric base layer 44 may be a thermally conductive, electrically insulating composite layer comprising a high temperature melt-flowable thermoplastic polymer mixed with a particulate filler material.

The particulate filler incorporated into the thermoplastic polymer matrix provides improved thermal expansion coefficient matching between the dielectric base layer 44 and the aluminum heat exchanger substrate 10 and with other layers of the electrical heating element 42. The particulate filler also increases the thermal conductivity of the dielectric base layer 44 to produce better heat transfer to the aluminum substrate and prevent generation of "hot spots" in the electrical heating element 42. The particulate filler also serves to reinforce the dielectric base layer 44, and prevents the subsequently applied layers of the electrical heating element 42 from sinking into the dielectric base layer 44 during application and/or curing of these subsequent layers.

The melt-flowable high temperature thermoplastic polymer of the dielectric layer 44 is selected from the group comprising polyphenylene sulfide (PPS), polyphthalamide (PPA), polyarylamide (PARA), liquid crystal polymer, polysulfone (PS), polyethersulfone (PES), polyphenylsulfone (PPSU), polyamide-imide (PAI), polyetheretherketone (PEEK), polyetherketone (PEK), polyetherketoneetherketone (PEKEK), self-reinforced polyphenylene (SRP), and combinations of any two or more thereof.

The particulate filler of the dielectric layer 44 is selected from the group comprising ceramics, glass or high temperature polymer particles. Examples of suitable ceramic materials include alumina, zirconia, silica, (optionally ceria stabilized zirconia or yttria stabilized zirconia), titania, calcium zirconate, silicon carbide, titanium nitride, nickel zinc ferrite, calcium hydroxyapatite and any combinations thereof. Alumina has the highest thermal conductivity and dielectric strength.

The filler material may have a particle size in the range from about 0.1 microns to about 100 microns, for example from about 0.1 to about 20 microns. The filler content of the dielectric base layer 44 is from about 5-80 weight percent, for example from about 20-60 weight percent, or for example from 35-45 weight percent.

Heat generated by the resistive heater layer 46 passes through the dielectric base layer 44 to the first plate 18, and the dielectric base layer 44 withstands continuous high operating temperatures, maintaining a solid structure at temperatures of about 180° C. or higher, and/or under thermal cycling of up to about 250° C. In addition, the dielectric base layer 44 resists' electrical breakdown and current leakage between the first plate 18 and the resistive heater layer 46 and/or the conductive layer 50. The dielectric base layer 44 may be a monolithic coating or it may comprise two or more coatings cured one on top of the other. Each of the coatings comprising the dielectric base layer 44 may have the same or different composition in terms of any one or more of the type and/or amount of melt-flowable high temperature thermoplastic polymer an/or the particular filler.

The resistive heater layer 46 may comprise an electrically resistive lead-free composite sol gel-based layer. The sol gel formulation contains reactive metal organic or metal salt sol gel precursors that are thermally processed after application on the dielectric base layer 44 to form an electrically resistive ceramic material which becomes heated when a voltage is applied to it. The sol gel formulation is a solution containing reactive metal organic or metal salt sol gel precursors that are thermally processed to form a ceramic material selected from the group comprising alumina, silica, zirconia, (optionally ceria stabilized zirconia or yttria stabilized zirconia), titania, calcium zirconate, silicon carbide, titanium nitride, nickel zinc ferrite, calcium hydroxyapatite and any combinations thereof.

The conductive layer 50 is deposited either before or after the resistive heater layer 46 and provides an electrical connection between an electrical power supply 52 and the resistive heater layer 46. The conductive layer 50 is lead-free and may be produced from a composite sol gel formulation that contains nickel, silver or any other suitable conductive powder or flake material. The sol gel formulation may be prepared from, but is not limited to, alumina, silica, zirconia, or titania metal organic precursors stabilized in solution. The conductive layers 50 of electrical heating elements 42 are electrically connected to the same or different electrical power supply 52 by any suitable means, such as electrical leads 54, 56 as shown in FIGS. 3 and 3A.

The electrically insulating dielectric top layer 48 is electrically insulating and may contain ceramic, glass or low melt flow high temperature polymer filler particles, and is deposited on top of the resistive heater layer 46 and/or conductive layer 50 to protect layers 46 and 50 from damage caused by oxidation, water, etc. It will be appreciated that the top layer 48 is optional, and may not be required in all embodiments.

In use, the electrical power supply 52 applies electrical power to the conductive layer 50 through leads 54, 56 to heat it. The power supply 52 may supply an AC or DC voltage. For use in BEVs and HEVs, the voltage will be at least 48V, for example 280V, or equal to or greater than 300V. The conductive layer 50 is structured so that the resistive heater layer 46 will become heated as uniformly as possible across its surface area. In some embodiments, the resistivity of the resistive heater layer 46 is about 48-100 ohms/square, with the resistor heat flux (power density) being up to about 25 W/cm$^2$ (160 W/in$^2$) or greater.

Additional details regarding the composition and structure of the electrical heating element 42 can be found in U.S. Pat. No. 8,653,423, which is incorporated herein by reference in its entirety.

In the first embodiment shown in FIGS. 1-3C, the first electrical heating element 42 is applied directly to the outer surface 22 of first plate 18, with the dielectric base layer 44 in direct contact with and thermally bonded directly to the outer surface 22 of first plate 18. To provide improved uniformity and adhesion, the outer surface 22 of first plate 18 is flat, and may optionally be surface treated by abrasion, rubbing or sandblasting.

Where the first and second channel structures 12, 14 are comprised of aluminum, they will be assembled by brazing and/or welding. These assembly steps are performed before application of the first electrical heating element 42 to the first plate 18, for example by a screen printing process. Therefore, according to the present embodiment, the electrical heating element 42 is applied after the other components of each of the first and second channel structures 12, 14 are fully assembled.

Each of the first and second channel structures 12, 14 may further comprise a turbulence-enhancing insert 58 such as a corrugated fin or a turbulizer in order to provide increased turbulence and surface area for heat transfer, thereby enhancing heat transfer from the electrical heating element 42 to the fluid in fluid flow passage 2 or 4. The turbulence-enhancing insert 58 also provides structural support for the first and second plates 18, 24, thereby enhancing rigidity of the heat exchanger 10.

Figure 3B:
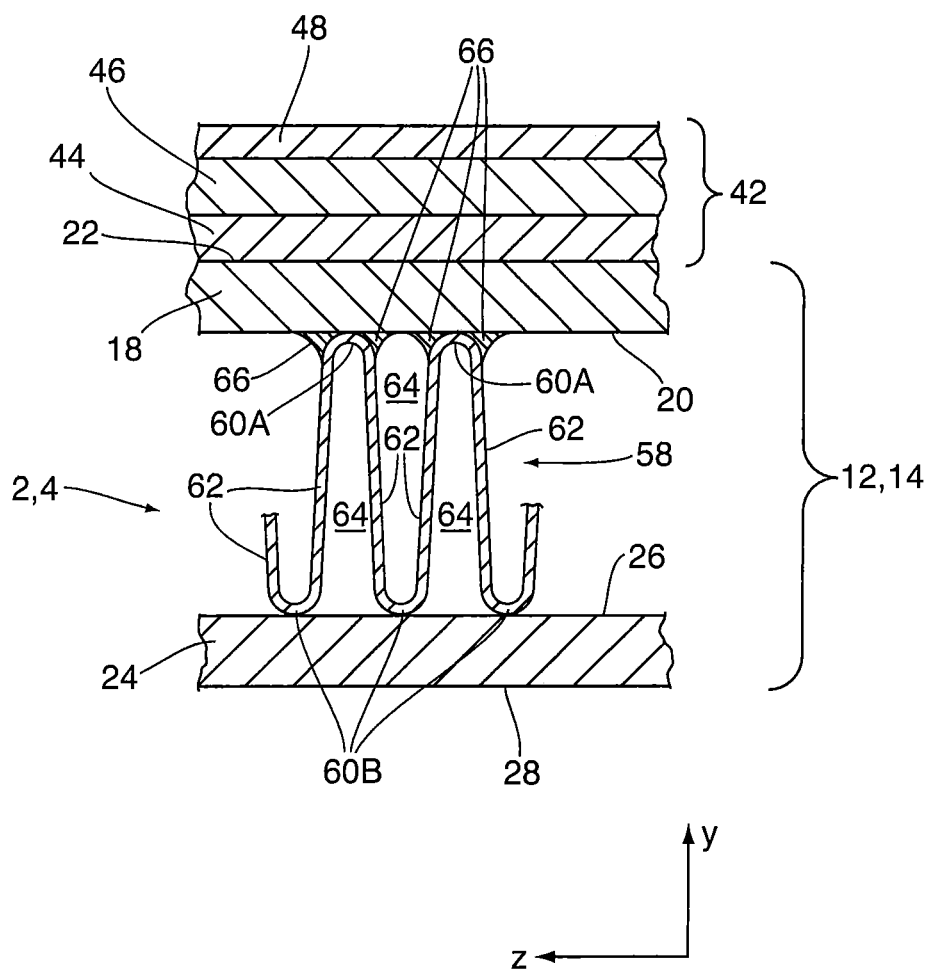
FIG. 3B is a schematic, partial cross-section in the z-y plane through one of the channel structures of the heat exchanger of FIG. 1.
Figure 3C:
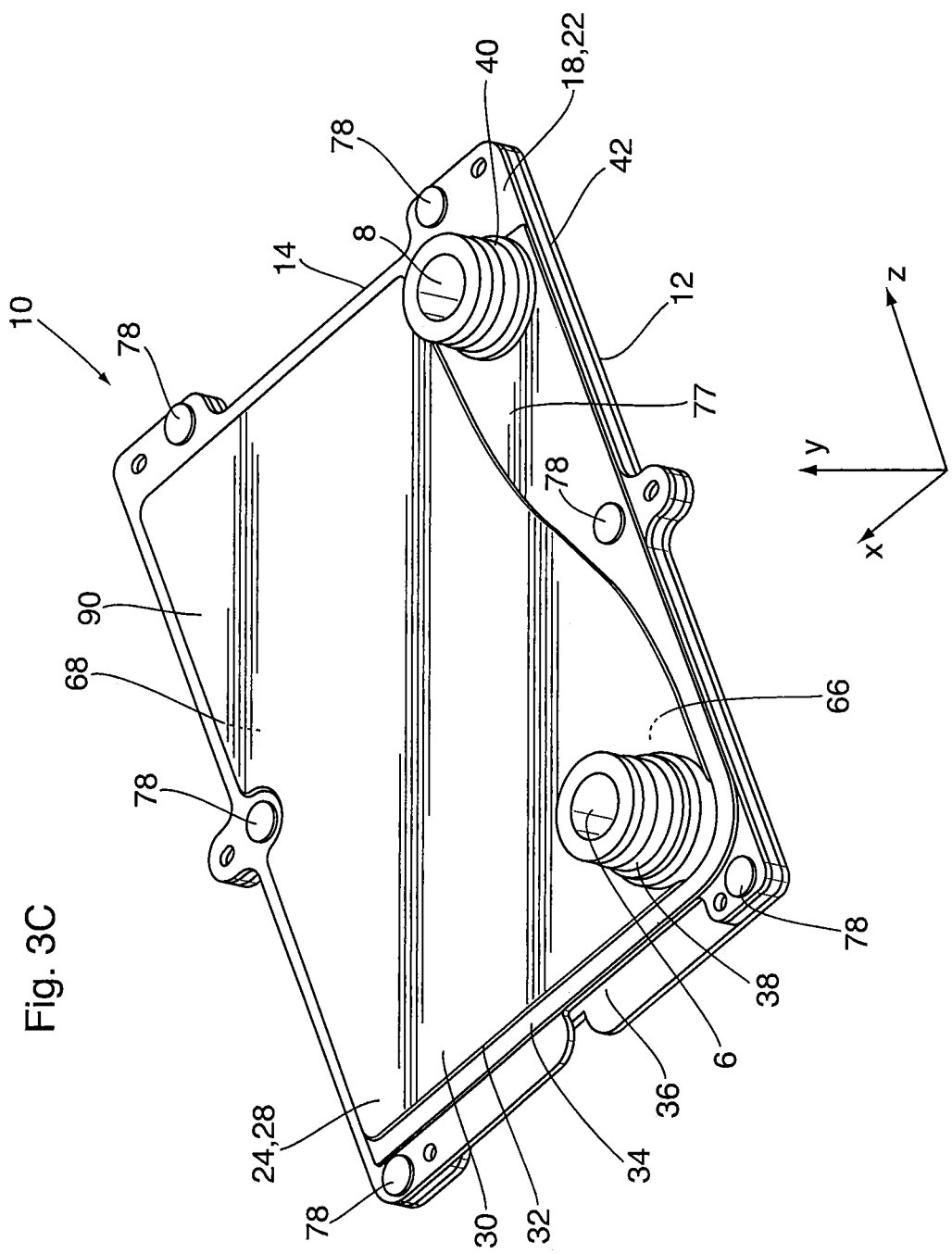
FIG. 3C is a bottom perspective view of the heat exchanger of FIG. 1.

As used herein, the terms "fin" and "turbulizer" are intended to refer to corrugated turbulence-enhancing inserts 58 having a plurality of ridges or crests 60 connected by side walls 62, with the ridges being flat or rounded, as shown in FIG. 3B. As defined herein, a "fin" has continuous ridges whereas a "turbulizer" has ridges which are interrupted along their length to provide a tortuous flow path. Turbulizers are sometimes referred to as offset or lanced strip fins, and examples of such turbulizers are described in U.S. Pat. No. Re. 35,890 (So) and U.S. Pat. No. 6,273,183 (So et al.). The patents to So and So et al. are incorporated herein by reference in their entireties.

The turbulence-enhancing insert 58 in each of the first and second channel structures 12, 14 may be oriented inside the fluid flow passage 2 or 4 with its ridges 60 arranged parallel to the direction of fluid flow through the fluid flow passage 2 or 4, such that the fluid flows through the openings 64 defined by the ridges 60 and side walls 62. This orientation of the insert 58 is referred to herein as the "low pressure drop" or "LPD" orientation. Alternatively, in some applications, the turbulence-enhancing insert 58 will be oriented inside the fluid flow passage 2 or 4 with its ridges 60 angled relative to the direction of fluid flow through fluid flow passage 2 or 4, the angle typically being 90 degrees. This orientation of the insert is referred to herein as the "high pressure drop" or "HPD" orientation. In the HPD orientation the fluid flows through openings in the side walls 62 and/or other interruptions in the side walls 62 or ridges 60 of the insert 58.

In heat exchanger 10, the turbulence-enhancing insert 58 has a first plurality of ridges 60A (referred to herein as the "top ridges") which are in contact with the inner surface 20 of first plate 18, and a second plurality of ridges 60B (referred to herein as the "bottom ridges") which are in contact with the inner surface 26 of the second plate 24.

According to another feature of heat exchanger 10, the top ridges 60A of the turbulence-enhancing insert 58 are metallurgically bonded, for example by brazing, to the inner surface 20 of first plate 18.

Because each channel structure 12, 14 includes only a first electrical heating element 42 which is located adjacent to the outer surface 22 of first plate 18, while there is no corresponding heating element provided along the outer surface 28 of second plate 24. Therefore, the bottom ridges 60B of the turbulence-enhancing insert 58 may or may not be metallurgically bonded to the inner surface 26 of the second plate 24.

It will be appreciated that the elements of the various heat exchangers illustrated in the drawings are not drawn to scale, particularly in schematic FIGS. 3A and 3B. For example, the thicknesses of the various elements of the heat exchangers described herein, including the heating elements integrated therein, are not drawn to scale in the drawings.

After the metal (i.e. aluminum) components of the first and second channel structures 12, 14 are joined together by brazing and the electrical heating elements 42 are applied to the outer surfaces 22 of the first plates 18, the first and second channel structures 12, 14 are mechanically joined together to form the heat exchanger 10. In the orientation shown in FIG. 1, the heat exchanger 10 is assembled as described below with the first channel structure 12 on top of the second channel structure 14.

Figure 2:
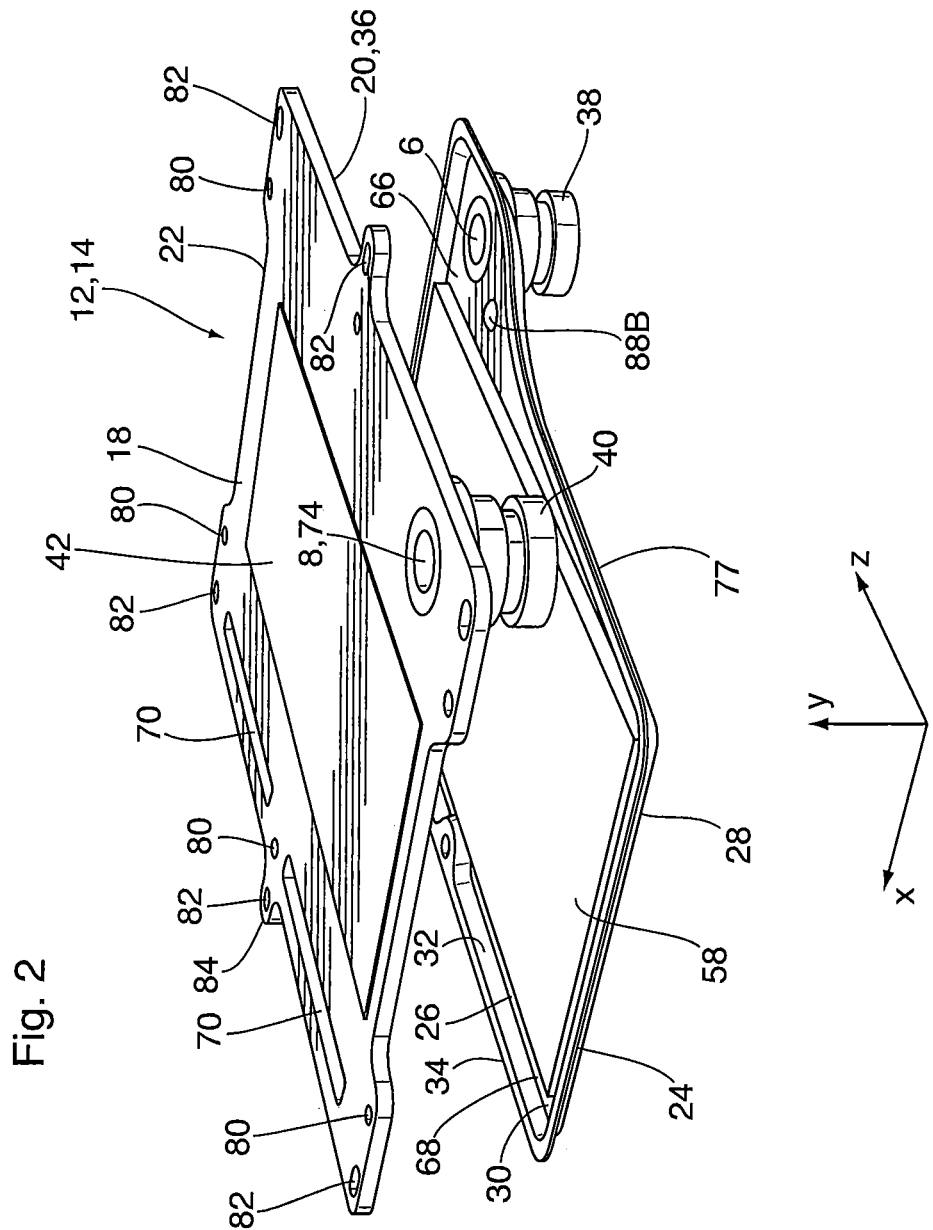
FIG. 2 is a perspective view of the two plates making up one of the channels of the multi-channel heat exchanger of FIG. 1.

As best seen in FIG. 2, the inlet port 6 is provided in the second plate 24 of the second channel structure 14, proximate to one of the corners, and the inlet fitting 38 projects from the outer surface 28 of the second plate 24. According to the orientation shown in FIG. 1, the inlet fitting 38 and inlet port 6 are located on the underside of the heat exchanger 10.

The fluid enters the second fluid flow passage 4 through inlet port 6 and flows into a first manifold space 66 (FIG. 2) which is in flow communication with the inlet port 6 and comprises a gap between the edge of the turbulence-enhancing insert 58 and the edge of second plate 24 along which the inlet port 6 is formed. The first manifold space 66 extends along the z-axis and provides an inlet manifold in which the fluid entering the second fluid flow passage 4 through inlet port 6 is distributed along the width of the second fluid flow passage 4 (along the z-axis) before flowing lengthwise through the second fluid flow passage 4 and the turbulence-enhancing insert 58 (along the x-axis), toward the opposite edge of second channel structure 14.

There is also a gap between the turbulence-enhancing insert 58 and the opposite edge of second plate 24, which gap comprises a second manifold space 68, extending along the z-axis and providing an outlet manifold. The second manifold space 68 is in flow communication with one or more first fluid openings 70 in the first plate 18 of the second channel structure 14. In the present embodiment there are two first fluid openings 70 in the form of slots which are elongated along the z-axis and which have a width (along the x-axis) similar to the width of the second manifold space 68 (along the x-axis).

The first and second spacers 16, 17 are flat plates or bars which are elongated along the z-axis and which are sealingly received between the first plate 18 of the first channel structure 12 and the first plate 18 of the second channel structure 14.

The first spacer 16 includes at least one fluid transfer opening 72 which is in fluid communication the second manifold space 68 through the first fluid openings 70 of the first plate. In the present embodiment, the first spacer 16 includes two fluid transfer openings 72 in the form of slots elongated along the z-axis, and being of the same or similar length and width as the slotted first fluid openings 70 of the first plate 18. As can be seen in FIG. 1, the fluid transfer openings 72 are surrounded by shallow grooves 144 which are adapted to receive sealing members 146 such as O-rings (FIG. 3A). Similar grooves 144 surround openings 72 on the opposite surface of spacer 16. The resilient sealing members 146 received in these grooves provide leak-proof seals between the top and bottom surfaces of spacer 16 and the outer surfaces of the first plates 18 of the first and second channel structures 12, 14.

The fluid exits the second fluid flow passage 4 of the second channel structure 14 through the first spacer 16 and then enters the first fluid flow passage 2 of the first channel structure 12. Except as otherwise noted below, the structures of the first and second channel structures 12, 14, and the plates 18, 24 from which they are comprised, are identical.

The first plate 18 of the first channel structure 12 is identical to that of the second channel structure 14 and includes at least one first fluid opening 70 as described above, which comprises two slot-shaped openings 70 in the present embodiment, these openings 70 being aligned with, and in flow communication with, the two fluid transfer openings 72 of first spacer 16. Thus, the fluid enters the first fluid flow passage 2 through the at least one first fluid opening 70 in the first plate 18 of the first channel structure 12. Openings 70 and 72 can be seen in schematic FIG. 3A.

The fluid flow passage 2 of the first channel structure 12 includes a first manifold space 66, a second manifold space 68 and a turbulence-enhancing insert 58 as described above. However, in the first channel structure 12, the second manifold space 68 provides an inlet manifold into which fluid entering the first fluid flow passage 2 is received, and the first manifold 66 space provides an outlet manifold as further described below.

The first plate 18 of each of the first and second channel structures 12, 14 includes at least one second fluid opening 74 located at an opposite edge of first plate 18 relative to the at least one first fluid opening 70. In the illustrated embodiment the at least one second fluid opening 74 comprises a circular opening proximate to a corner of the first plate 18.

In the first channel structure 12, the second fluid opening 74 is in flow communication with the first manifold space 66 (i.e. outlet manifold) of the first fluid flow passage 2. It can be seen that the second plate 24 of the first channel structure 12 is identical to the second plate 24 of the second channel structure 14 except that it lacks an opening corresponding to the inlet port 6. Accordingly, the second fluid opening 74 in the first channel structure provides the outlet for the first fluid flow passage 2.

The second spacer 17 includes at least one fluid transfer opening 76 which is in fluid communication the first manifold space 66 of first channel structure 12 through the second fluid opening 74 of the first plate 18. In the present embodiment, the second spacer 17 includes a single circular fluid transfer opening 76 which is aligned with the circular second fluid opening 74 of the first plate 18, and being of the same or similar diameter. As can be seen in FIG. 1, the fluid transfer opening 76 is surrounded by a shallow groove 144 which is adapted to receive a resilient sealing member 146 (FIG. 3A) such as an O-ring (not shown). A similar groove 144 surrounds opening 76 on the opposite surface of spacer 17. The resilient sealing members 146 received in these grooves 144 provide leak-proof seals between the top and bottom surfaces of spacer 17 and the outer surfaces of the first plates 18 of the first and second channel structures 12, 14.

The first plate 18 of the second channel structure 14 includes a second fluid opening 74 which also serves at the outlet port 8 of heat exchanger 10. The outlet port 8 receives the fluid exiting the first fluid flow passage 2 through the second spacer 17. Openings 74 and 76 can be seen in schematic FIG. 3A.

Figure 4:
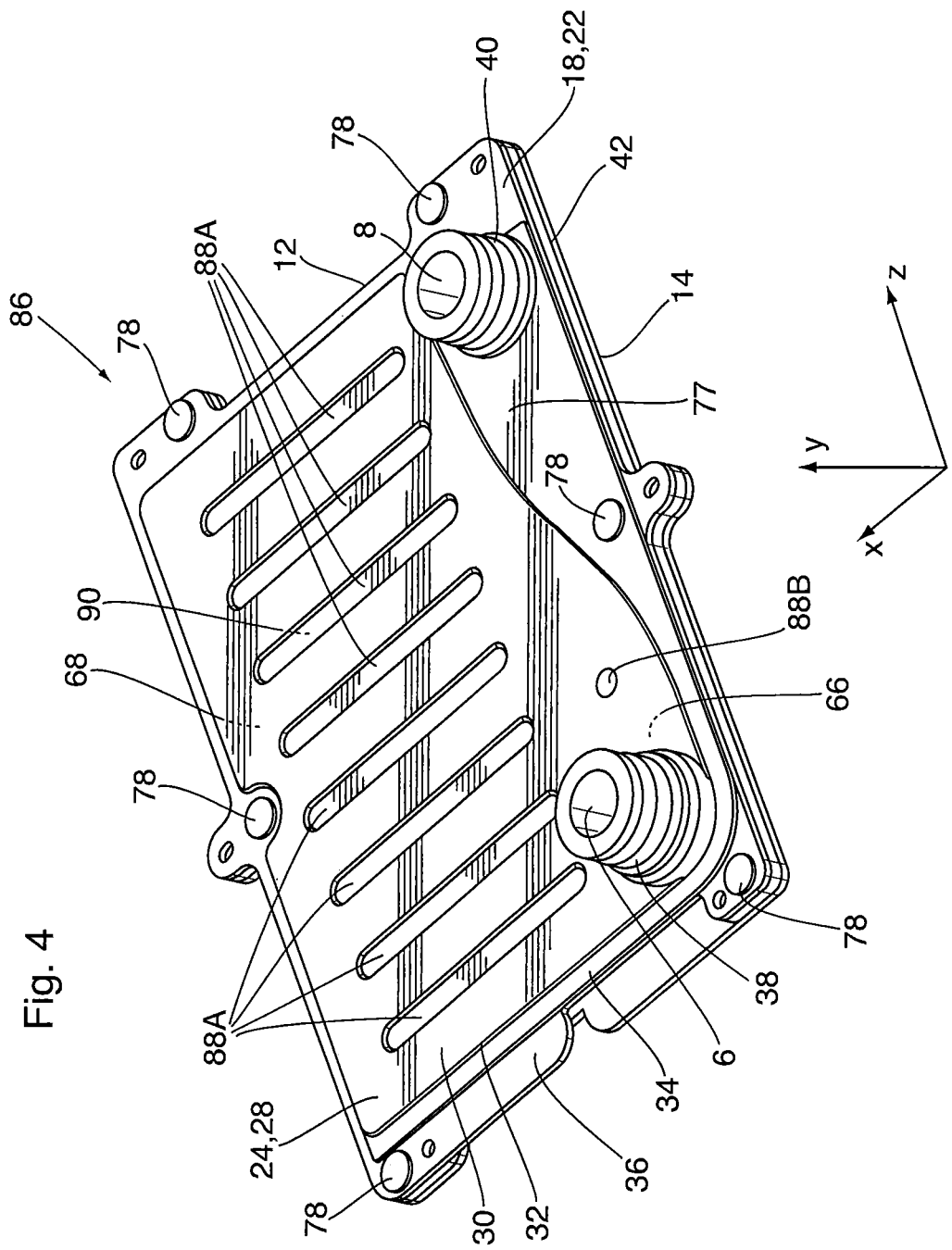
FIG. 4 is a perspective view of a multi-channel heat exchanger according to a second embodiment.

The second plate 24 of first channel structure 12 includes an indentation or cut-out area 77 at one corner of plate 24 at which the raised peripheral sidewall 32 and planar flange 34 do not follow the rectangular peripheral shape of the first plate 18, but rather deviate inwardly away from the peripheral edge of the first plate 18 to provide the cut-out area 77. The cut-out area 77 is provided so that the outlet port 8 lies outside the area of the second plate 24. This can be seen in FIG. 2. This allows the outlet fitting 40 to be attached directly to the outer surface 22 of the first plate 18 of the second channel structure 14. It will be appreciated that the size and shape of cut-out area 77 can vary. Alternatively, as shown in the bottom view of FIG. 3C, the cut-out area 77 can be formed by causing only the peripheral sidewall 32 to deviate inwardly away from the peripheral edge of the first plate 18, while providing a planar flange 34 which extends throughout the cut-out area 77 and follows the peripheral edge of the first plate 18. In such an arrangement, the planar flange 34 of second plate 24 would have an opening aligned with the second fluid opening 74 of the first plate 18, and the outlet fitting 40 would instead be attached to the outer surface 28 of the second plate 24. Such an arrangement is also shown in the embodiment of FIG. 4, discussed below.

The heat exchanger 10 also includes a plurality of mechanical fasteners 78 such as screws, bolts or rivets which pass through aligned fastener holes 80 of the plates 18 and spacers 16, 17 to form sealed connections between the first plates 18 of the first and second channel structures 12, 14, and the spacers 16, 17. As shown, the fastener holes 80 are provided about the outer peripheries of plates 18 and corresponding areas of spacers 16, 17. The plates 18, 24 and spacers 16, 17 may also include aligned mounting holes 82 for mounting heat exchanger 10 to another structure, such as a housing (not shown). At least some of the mounting holes 82 in the first plates 18 and spacers 16, 17 may be provided in protruding lugs 82. Corresponding fastener holes 80 and mounting holes 82 may pass through the outer sealing surfaces 34 of second plates 24, however, in the present embodiment, the holes 80, 82 are located outside the peripheries of the second plates 24. As shown in FIG. 3A, grooves 144 may also be provided in the outer surfaces 22 of first plates 18, surrounding openings 70 and 74, the grooves 144 receiving resilient sealing elements 146 such as O-rings to provide fluid-tight seals around the openings 70, 72, 74, 76.

Where the heat exchanger 10 is comprised of aluminum, the aluminum components of each individual channel structure 12, 14 (i.e. plates 18, 24, insert 58 and fittings 38 and/or 40) are fully assembled by brazing and/or welding before application of the electrical heating elements 42 to the first plates 18, for example by a screen printing process. The assembly of heat exchanger 10 is completed after application of the electrical heating elements 42, by mechanically combining the assembled channel structures 12, 14 with the spacers 16, 17 and fastening them together with mechanical fasteners 78.

It can be seen that the electrical heating elements 42 of the first and second channel structures 12, 14 are in direct facing relation to one another in heat exchanger 10, and are protected from contact with other components. In use, heat exchanger 10 can be used for directly and/or indirectly heating, and optionally cooling, one or more vehicle components. For example, indirect heating of a vehicle component may be accomplished by activating one or both of the electrical heating elements 42 to heat a fluid flowing through the heat exchanger 10, followed by heat transfer from the heated fluid to one or more vehicle components to be heated, including the passenger cabin. Direct heating of one or more vehicle components may be accomplished by placing one or more vehicle component to be heated in contact with one or more external surface of the heat exchanger 10. For example, one or more vehicle components may be placed in contact with the outer surface 28 of second plate 24 of the first and/or second channel structure 12, 14, which is flat and planar. In the direct heating mode of heat exchanger 10, one or both of the electrical heating elements 42 are activated to heat the plates 18, 24 and the fluid flowing through the first and second fluid flow passages 2, 4. Some of this heat is directly transferred to the one or more vehicle components to increase their temperature, for example under cold start conditions. Also, the fluid heated in heat exchanger 10 may be used for indirect heating of one or more other vehicle components which are remote from heat exchanger 10. In the direct cooling mode of heat exchanger 10, both of the electrical heating elements 42 are de-activated, and the one or more vehicle components in contact with one or more external surface of the heat exchanger 10 will transfer heat to the fluid flowing through heat exchanger 10, at least where the fluid is cooler than the one or more vehicle components.

In some embodiments, the vehicle components may comprise batteries. If desired, the heat exchanger 10 and the vehicle component(s) may be enclosed within a housing, with the inlet and outlet fittings 38, 40 projecting through a wall of the housing for connection to a fluid circulation system.

Once the vehicle components are sufficiently heated, the heat exchanger 10 may cease functioning as a heater, and may commence functioning as a cooler to prevent overheating of the vehicle components. In this regard, under certain modes of operation, the electrical heating elements 42 are de-activated and the fluid circulation system may be configured to supply a fluid to the heat exchanger 10 which is at a lower temperature than the temperature of the vehicle component(s) which are in contact with the first and/or second channel structures 12, 14. Under these conditions, heat will be transferred from the vehicle component(s) to the fluid circulating through the first and second flow passages 2, 4, to cool the components.

Although FIGS. 1 to 3C show a heat exchanger 10 having a specific configuration, it will be appreciated that other configurations are possible. For example, the inlet and outlet fittings 38, 40 may project from opposite sides of heat exchanger 10. In this regard, the second fluid openings 74 of first plates 18 can be eliminated and/or the second spacer 17 may be provided without an opening 76, while the second plate 24 of the first channel structure 12 may be provided with an outlet port 8 and outlet fitting 40, corresponding to the inlet port 6 and inlet fitting. 38 provided in the second plate 24 of the second channel structure 14. In such a heat exchanger 10, the outlet fitting 40 would extend upwardly from the top of heat exchanger 10, while the inlet fitting 38 would continue to extend downwardly from the bottom of heat exchanger 10.

FIG. 4 shows a top perspective view of a multi-channel heat exchanger 86 according to a second embodiment, which is similar to heat exchanger 10 in a number of respects and in which like reference numerals are used to identify like elements. Unless otherwise indicated, the above description of the like elements of heat exchanger 10 apply equally to heat exchanger 86, and the following discussion will focus primarily on the differences between heat exchangers 10 and 86.

In heat exchanger 86, the turbulence-enhancing insert 58 is replaced by a plurality of turbulence-enhancing features which are formed directly in one or both of the first plate 18 and second plate 24. In this regard, one or both of the first and second plates 18, 24 may be provided with a plurality of protrusions 88, the protrusions being formed in the plate 18, 24 by stamping or drawing.

For example, heat exchanger 86 has an overall configuration which is similar to that of heat exchanger 10, with each of the first and second channel structures 12, 14 comprising a flat first plate 18 and a shaped second plate 24. Instead of having a turbulence-enhancing insert 58, each channel structure 12, 14 of heat exchanger 86 has a plurality of protrusions 88 formed in the flat, planar base 30 of the second plate 24, as shown in FIG. 4. The protrusions 88 have the same height as the planar flange 34 above the base 30 of second plate 24, and each protrusion 88 has a rounded or flat sealing surface 90 which is co-planar with the sealing surface of planar flange 34. The flat sealing surfaces 90 of the protrusions 88 are metallurgically bonded to the inner surface 22 of the first plate 18 so as to provide similar heat transfer benefits as the bonding of the turbulence-enhancing inserts 58 to the first plate 18 in heat exchanger 10, as discussed above. In addition to providing increased turbulence and surface area for heat transfer, the protrusions 88 provide structural support for the first and second plates 18, 24, thereby enhancing rigidity of the channel structures 12, 14 and that of heat exchanger 86.

The protrusions 88 may have various shapes, when viewed in plan. For example, the protrusions 88 may be elongated in the direction of fluid flow in fluid flow passages 2, 4 (along the x-axis), or angled relative to the direction of fluid flow. Such elongated protrusions 88 may be straight or curved, and are referred to herein as "ribs", and are identified as 88A in FIG. 4. Where the protrusions are not significantly elongated in any direction they are referred to herein as "dimples", and are identified as 88B in FIG. 4, in which one dimple 88B is provided for structural support in the first manifold space 66. A similar dimple 88B is provided in the first manifold space 66 in heat exchanger 10 (FIG. 2), since the first manifold space 66 is unsupported by the turbulence-enhancing insert 58.

Whether they are in the form of dimples 88B or ribs 88A, the protrusions 88 direct the fluid flow through fluid flow passages 2, 4, and/or provide structural support for passages 2, 4. Further, it can be seen that the ends of the ribs 88B are spaced from the edges of the fluid flow passages 2, 4, thereby providing first and second manifold spaces 66, 68 as described above, providing fluid distribution across the widths of fluid flow passages 2, 4 (along the z-axis).

Figure 5:
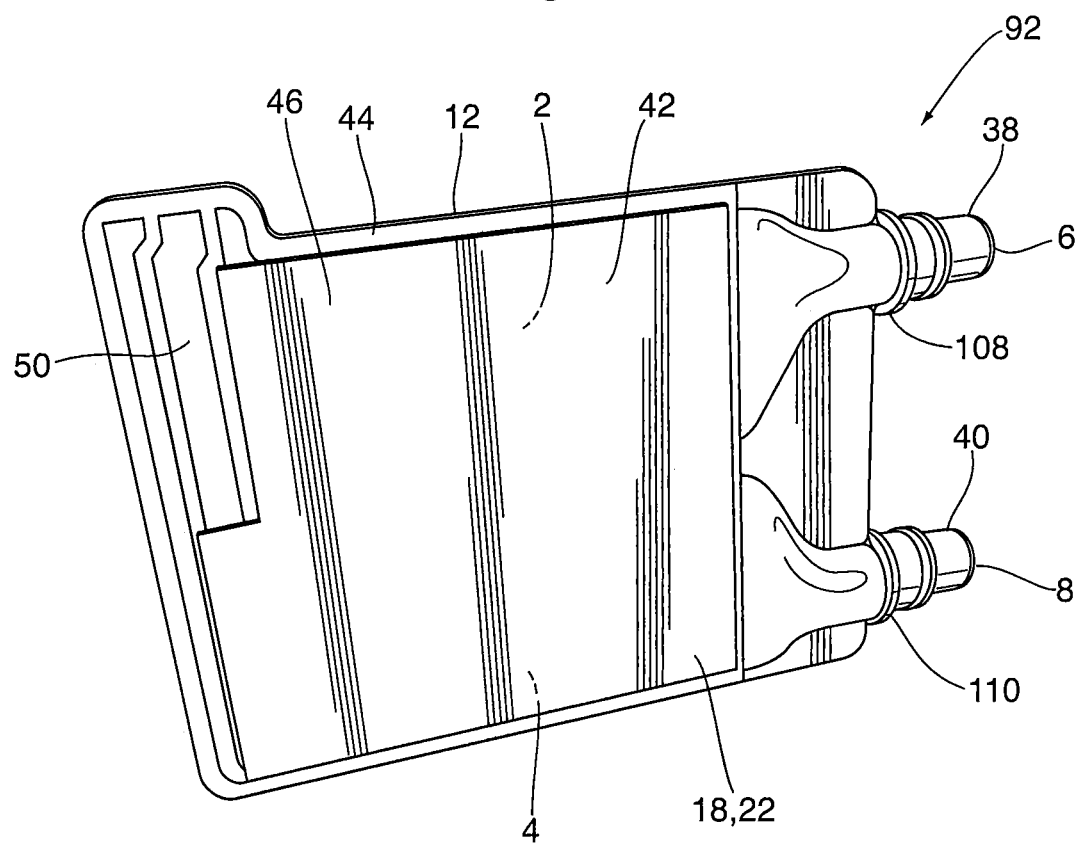
FIG. 5 is a top perspective view of a multi-channel heat exchanger according to a third embodiment.
Figure 6:
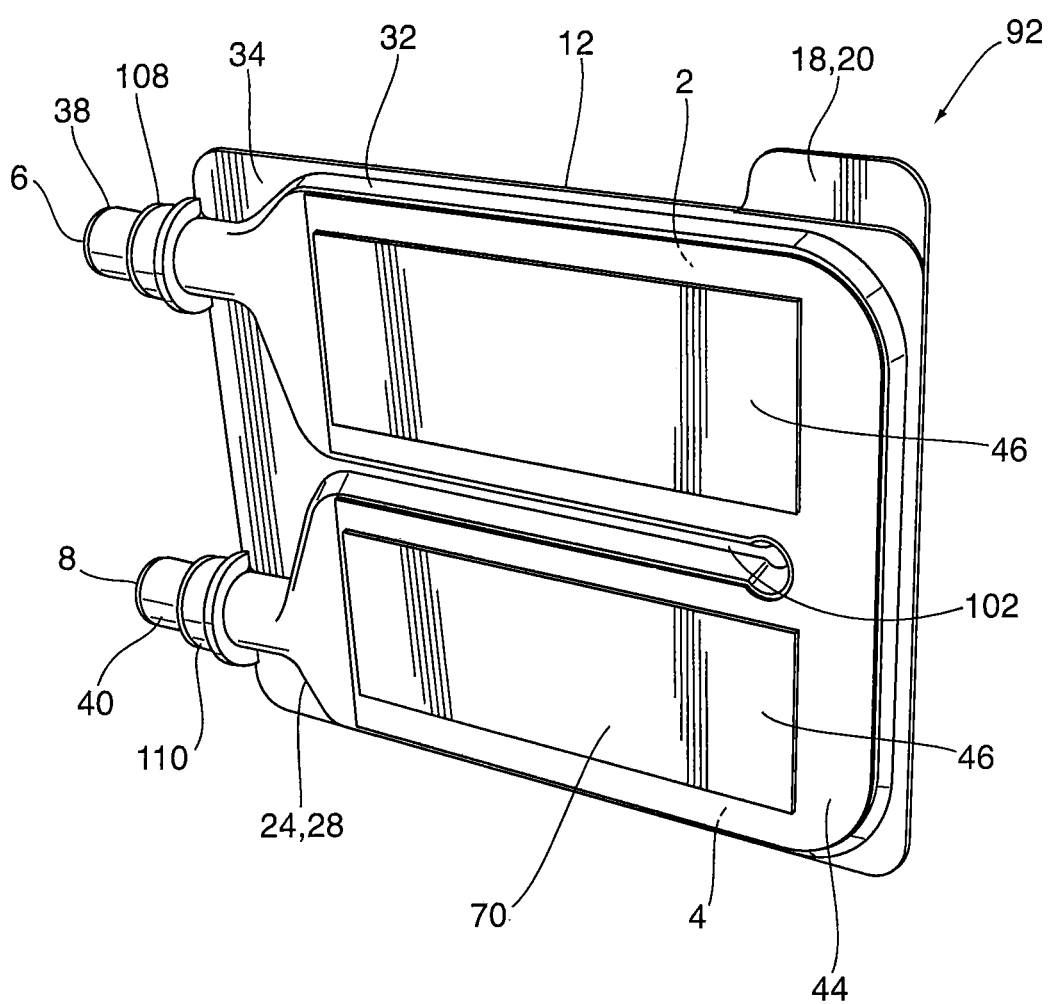
FIG. 6 is a bottom perspective view of the multi-channel heat exchanger of FIG. 5.
Figure 7:
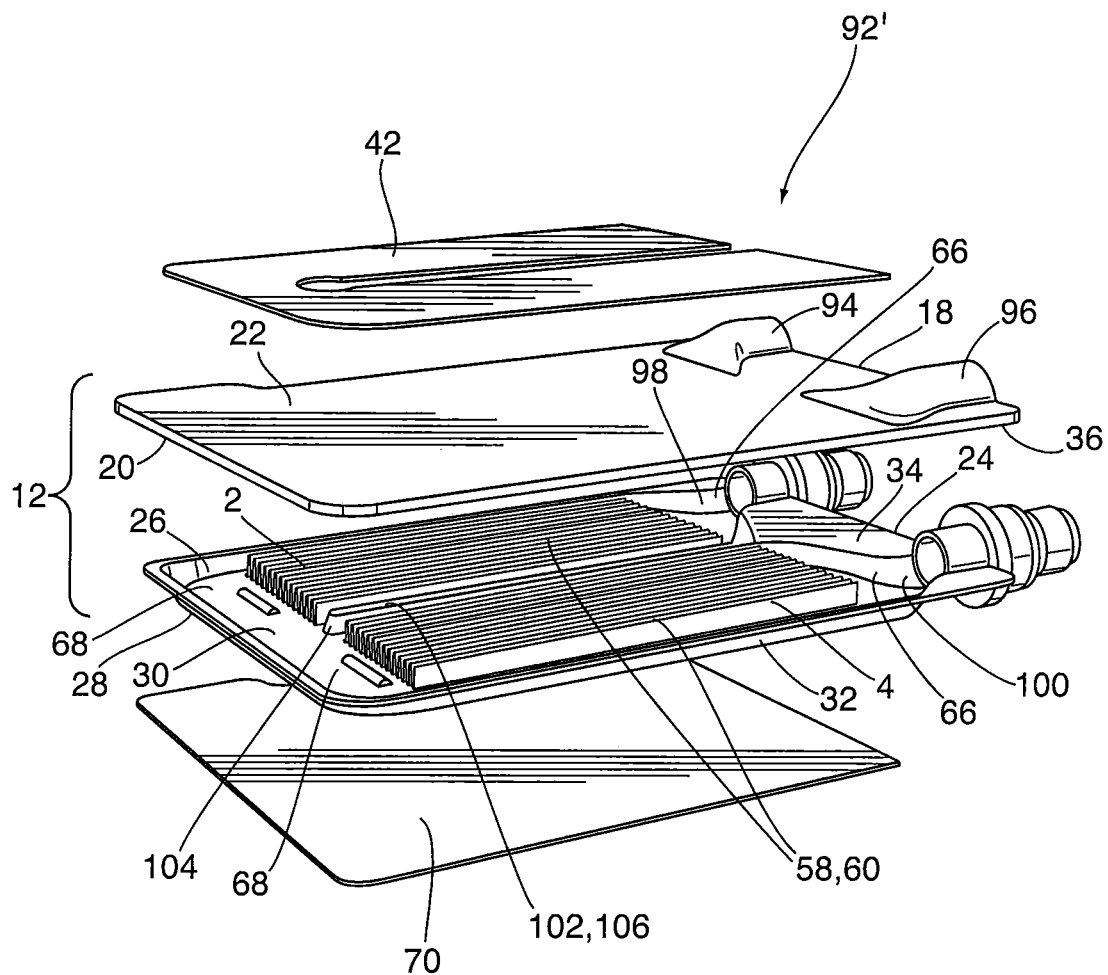
FIG. 7 is a perspective view of a multi-channel heat exchanger which is a minor variant of the heat exchanger of FIGS. 5 and 6, shown in a partly disassembled state.

FIGS. 5 to 6 show a multi-channel heat exchanger 92 according to a further embodiment, and FIG. 7 shows a heat exchanger 92' according to a minor variant of this embodiment. Heat exchangers 92 and 92' are similar to heat exchangers 10 and 86 in a number of respects and in like reference numerals are used to identify like elements in the drawings and in the following description. Unless otherwise indicated, the above description of the like elements of heat exchangers 10 and 86 apply equally to heat exchangers 92 and 92', and the following discussion will focus primarily on the ways in which heat exchangers 92 and 92' differ from heat exchangers 10 and 86.

In the heat exchangers 10 and 86 described above, a two-pass or U-flow configuration is achieved by stacking first and second channel structures 12, 14 one on top of the other to provide first and second fluid flow passages 2, 4 which are similarly arranged one on top of the other. By contrast, heat exchangers 92 and 92' achieve a two-pass or U-flow configuration by providing a single channel structure, referred to herein as first channel structure 12, having a central dividing rib 102 such that the first and second fluid flow passages 2, 4 are arranged side-by-side.

Heat exchangers 92 and 92' comprise a first plate 18 having inner and outer surfaces 20, 22 which are flat and planar, except for socket portions 94, 96 which are provided along one end of first plate 18 for reasons which will be discussed below.

The second plate 24 has inner and outer surfaces 26, 28 and is shaped, for example by stamping or drawing, such that it has a generally flat, planar base 30 surrounded on all sides by a raised peripheral sidewall 32 extending from the base 30 to a planar flange 34 defining a sealing surface along which the planar flange 34 is sealed to a planar, peripheral sealing surface 36 on the inner surface 20 of first plate 18, for example by brazing or welding. The raised peripheral sidewall 32 and planar flange 34 are interrupted along one end of second plate 24 by socket portions 98, 100 which are also formed by stamping or drawing, and are provided for reasons which are discussed below.

The central dividing rib 102 is also provided in the second plate 24 and extends longitudinally (along x-axis in FIG. 7) from the raised peripheral sidewall 32 at a point between the socket portions 98, 100 to a terminal end 104 which is spaced from the raised peripheral sidewall 32 at the opposite end of the second plate 24. The dividing rib 102 has a rounded or flat top sealing surface 106 which is sealed to the inner surface 20 of first plate 18, for example by brazing or welding. It can be seen that the central dividing rib 102 separates the first fluid flow passage 2 from the second fluid flow passage 4, with the gap at the terminal end 104 of dividing rib 102 providing flow communication between first and second fluid flow passages 2, 4.

The socket portions 94, 96, 98, 100 each have a semi-cylindrical shape, at least proximate to the edges of the plates 18, 24. When the plates 18, 24 are assembled, socket portions 94, 98 combine to form a first cylindrical socket 108 providing flow communication with the first fluid flow passage 2, and socket portions 96, 100 combine to form a second cylindrical socket 110 providing flow communication with the second fluid flow passage 4. Tubular fittings 38, 40 are sealingly received inside first and second sockets 108, 110, for example by brazing or welding, the fittings 38, 40 projecting outwardly from the edge of the heat exchangers 92 and 92' along the x-axis, and parallel to the plane of the plates 18, 24. Either fitting 38, 40 may serve as the inlet or outlet. Although the heat exchangers 92 and 92' is described herein as having side entry fittings 38, 40, it will be appreciated that each of the fittings 38, 40 may instead project from either the first plate 18 or the second plate 24, along the y-axis, in the manner of similarly constructed heat exchanger 112 described below.

Each of the fluid flow passages 2, 4 of heat exchanger 92 is provided with a turbulence-enhancing insert 58 in the form of a corrugated fin or turbulizer, or with elongate ribs 88A extending lengthwise through the flow passages 2, 4. In the present embodiment each fluid flow passage 2, 4 is provided with a turbulence-enhancing insert 58 arranged in the LPD orientation, comprising a corrugated fin with ridges 60 extending lengthwise through the fluid flow passage 2, 4. As can be seen from FIG. 7, a first manifold space 66 is provided between an edge of each turbulence-enhancing insert 58 and the inlet or outlet fitting 38, 40, and a second manifold space 68 is provided between the opposite edge of the turbulence-enhancing insert 58 and the raised peripheral sidewall 32 of the second plate 24, wherein the manifold spaces 66, 68 provide fluid distribution across the widths of fluid flow passages 2, 4.

Heat exchangers 92 and 92' also differ from heat exchangers 10 and 86 in that heat exchanger 92 includes a first electrical heating element 42 adjacent to the outer surface 22 of first plate 18, and a second electrical heating element 70 adjacent to the outer surface 28 of second plate 24. The second electrical heating element 70 may be identical to the first electrical heating element 42 described above, comprising a dielectric base layer 44, resistive heat exchanger layer 46, dielectric top layer 48 and conductive layer 50, and heating element 70 may be connected to the same or different electrical power supply by electrical leads, in the same manner as described above with reference to FIG. 3A. The electrical heating elements 42, 70 are configured slightly differently in heat exchangers 92 and 92'. In this regard, the second heating element 70 of heat exchanger 92 has a similar configuration to the first heating element 42 of heat exchanger 92', and the second heating element 70 of heat exchanger 92' has a configuration similar to that of the first heating element 42 of heat exchanger 92. In addition, the second heating element 70 of heat exchanger 92' may be applied to the outer surface of a heat sink plate 78 which is metallurgically bonded to second plate 24.

The second electrical heating element 70 may be applied directly to the flat portions of the outer surface 28 of second plate 24, i.e. excluding the area of the central dividing rib 102 and the socket portions 98, 100, with the dielectric base layer 44 in direct contact with and thermally bonded to outer surface 28 of second plate 24. To provide improved uniformity and adhesion, the outer surface 28 of second plate 24 may optionally be surface treated by abrasion, rubbing or sandblasting.

Where the heat exchangers 92 and 92' are comprised of aluminum, the aluminum components of heat exchangers 92 and 92' (i.e. plates 18, 24, insert 58 and fittings 38, 40) are fully assembled by brazing and/or welding before application of the first and second electrical heating elements 42, 70 to the first and second plates 18, 24, for example by a screen printing process. Also, because electrical heating elements 42, 70 are applied to the outer surfaces 22, 28 of the first and second plates 18, 24, it will be appreciated that the ridges 60 of the turbulence-enhancing insert 58 are metallurgically bonded to the inner surfaces 20, 26 of the first and second plates 18, 24.

Vehicle components to be directly heated and optionally cooled may be placed adjacent to or in contact with the electrical heating elements 42, 70 along the top and bottom surfaces of heat exchangers 92 and 92', which may or may not be enclosed within a housing (not shown). In addition, the heat exchangers 92 and 92' may be used for indirect heating of vehicle components remote from the heat exchangers 92 and 92', whether or not the heat exchangers 92 and 92' are also used for direct heating.

Figure 8:
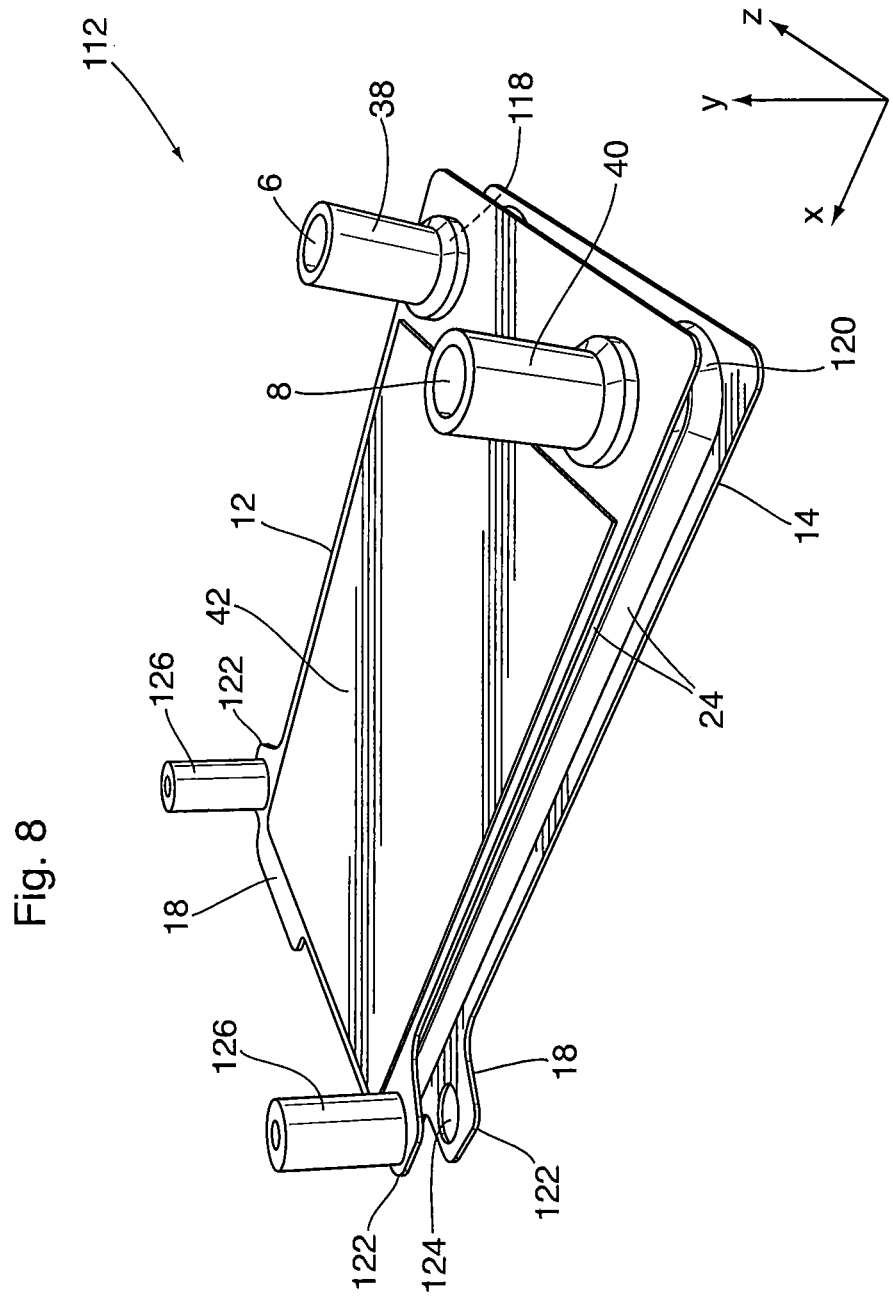
FIG. 8 is a top perspective view of a multi-channel heat exchanger according to a fourth embodiment.
Figure 9:
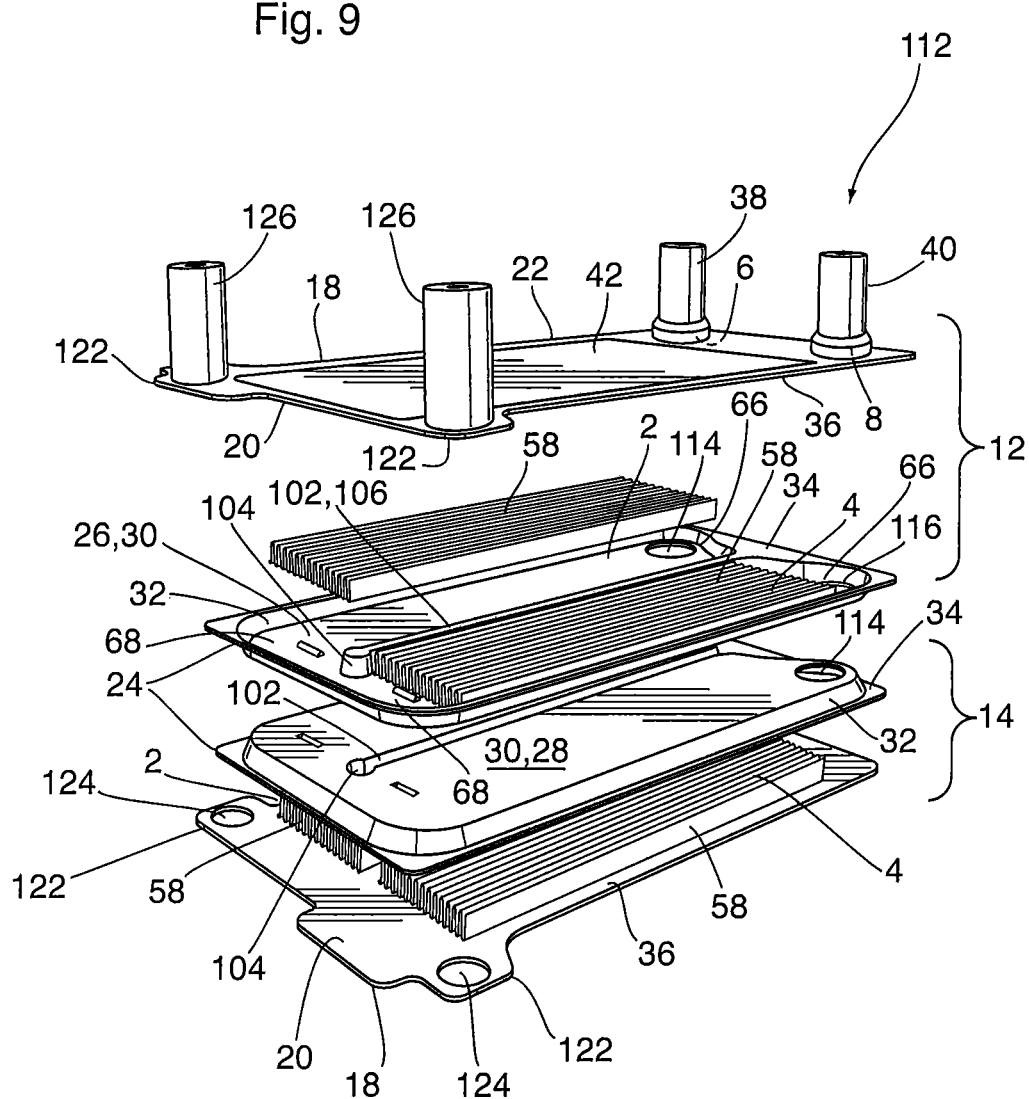
FIG. 9 is a perspective view of the multi-channel heat exchanger of FIG. 8 in a partly disassembled state.

FIGS. 8 and 9 show a multi-channel heat exchanger 112 which is similar to heat exchangers 10, 86, 92 and 92' in a number of respects and in which like reference numerals are used to identify like elements. Unless otherwise indicated, the above description of the like elements of heat exchangers 10, 86, 92 and 92' apply equally to heat exchanger 112, and the following discussion will focus primarily on the ways in which heat exchanger 112 differs from heat exchangers 10, 86, 92 and 92'.

Heat exchanger 112 is similar to heat exchangers 92 and 92' described above in that it provides first and second fluid flow passages 2, 4 arranged side-by-side. Also, heat exchanger 112 is similar to heat exchangers 10 and 86 in that it includes first and second channel structures 12, 14 stacked one on top of the other. However, heat exchanger 112 differs from heat exchangers 10 and 86 described above in that it lacks spacers between the first and second channel structures 12, 14, and in that an electrical heating element 42 is applied to the top and/or bottom surfaces of heat exchanger 112, i.e. the outer surfaces, rather than being located on interior surfaces thereof. Therefore, where the components of heat exchanger 112 (other than heating element(s) 42) are comprised of aluminum, they can be assembled by brazing or welding before application of the electrical heating. element(s) 42. This eliminates the need for mechanical joining of the first and second channel structures 12, 14 after application of electrical heating element(s) 42.

Each channel structure 12, 14 of heat exchanger 112 comprises a first plate 18 having inner and outer surfaces 20, 22 which are flat and planar, and a second plate 24 having inner and outer surfaces 26, 28 which is shaped, for example by stamping or drawing. The second plate 24 has a generally flat, planar base 30 surrounded on all sides by a raised peripheral sidewall 32 which extends from the base 30 to a planar flange 34 which defines a sealing surface along which the flange 34 is sealed to a planar, peripheral sealing surface 36 on the inner surface 20 of first plate 18, for example by brazing or welding.

The heat exchanger 112 includes two first plates 18 and two second plates 24. The second plates 24 are identical to one another and are secured together in a back-to-back arrangement, i.e. with the outer surface 28 of one second plate 24 bonded directly to the outer surface 28 of the other second plate 24. In addition, the base 30 of each second plate 24 is provided with two fluid openings 114, 116 close to the same end of the second plate 24, wherein fluid openings 114, 116 are in flow communication with the first and second fluid flow passages 2, 4. The opening 114 in each plate 24 is aligned with the opening 116 in the adjacent plate 24.

The two first plates 18 have approximately the same shape and size as one another, but are not identical. In this regard, the first plate 18 of the first channel structure 12 has inlet and outlet ports 6, 8 provided with tubular inlet and outlet fittings 38, 40 projecting from the outer surface 22 thereof. The inlet port 6 and fitting 38 are aligned with and in flow communication with aligned fluid openings 114, 116 of the two second plates 24, such that the inlet port 6 and fitting 38 are in flow communication with the first fluid flow passage 2 in both the first and second channel structures 12, 14. Similarly, the outlet port 8 and fitting 40 are aligned with and in flow communication with aligned fluid openings 114, 116 of the two second plates 24, such that the outlet port 8 and fitting 40 are in flow communication with the second fluid flow passage 42 in both the first and second channel structures 12, 14. In this way, the aligned fluid openings 114, 116 provide inlet and outlet manifolds 118, 120 extending throughout the height of the heat exchanger 112, i.e. along the y-axis. These manifolds 118, 120 are open at their top ends to ports 6, 8 and closed at their opposite, lower ends by the first plate 18 of the second channel structure 14, which lacks openings corresponding to ports 6, 8.

Each second plate 24 has a central dividing rib 102 which extends longitudinally (along x-axis in FIG. 9) from the raised peripheral sidewall 32 at a point between the openings 114, 116 to a terminal end 104 which is spaced from the raised peripheral sidewall 32 at the opposite end of each second plate 24. The dividing rib 102 has a rounded or flat top sealing surface 106 which is sealed to the inner surface of first plate 18, for example by brazing or welding. It can be seen that the central dividing rib 102 separates the first fluid flow passage 2 from the second fluid flow passage 4, in each of the channel structures 12, 14, with the gap at the terminal end 104 of dividing rib 102 providing flow communication between first and second fluid flow passages 2, 4.

Each of the fluid flow passages 2, 4 of heat exchanger 112 is provided with a turbulence-enhancing insert 58 in the form of a corrugated fin or turbulizer, or with elongate ribs 88A extending lengthwise through the flow passages 2, 4. In the present embodiment each fluid flow passage 2, 4 is provided with a turbulence-enhancing insert 58 arranged in the LPD orientation, comprising a corrugated fin with ridges 60 extending lengthwise through the fluid flow passage 2, 4. As can be seen from FIG. 9, a first manifold space 66 is provided between an edge of each turbulence-enhancing insert 58 and the fluid openings 114; 116, and a second manifold space 68 is provided between the opposite edge of the turbulence-enhancing insert 58 and the raised peripheral sidewall 32 of the second plate 24, wherein the manifold spaces 66, 68 provide fluid distribution across the widths of fluid flow passages 2, 4.

The heat exchanger 112 also includes a mounting arrangement comprising a pair of outwardly extending lugs 122 located at opposed corners of the first plates 18, and opposite to the end at which the inlet and outlet ports 6, 8 are provided. The lugs 122 have holes 124, and the two lugs 122 of one of the first plates 18 are provided with internally threaded cylindrical mounting studs 126 for threaded engagement with a fastener (not shown).

FIG. 8 shows that a first electrical heating element 42 is applied to the outer surface 22 of first plate 18 of first channel structure 12, i.e. the top of the heat exchanger 112 from which fittings 38, 40 and studs 126 protrude. Alternatively or in addition to first electrical heating element 42, a second electrical heating element 70 may be applied to the outer surface 22 of first plate 18 of the second channel structure 14, i.e. the flat bottom of heat exchanger 112. The first and second electrical heating elements 42, 70 may each comprise a dielectric base layer 44, resistive heat exchanger layer 46, dielectric top layer 48 and conductive layer 50, and may be connected to the same electrical power supply 52 by electrical leads 72, 74, or to a different electrical power supply.

Where the heat exchanger 112 is comprised of aluminum, the aluminum components of heat exchanger 92 (i.e. plates 18, 24, insert 58, fittings 38, 40, studs 126) are fully assembled by brazing and/or welding before application of the first and/or second electrical heating elements 42, 70 to the first plates 18 of the first and second channel structures 12, 14, for example by a screen printing process. Also, because electrical heating elements 42, 70 are applied to the outer surfaces 22 of the first plates 18, it will be appreciated that the ridges 60 of the turbulence-enhancing inserts 58 are metallurgically bonded to at least the inner surfaces 20 of the first plates 18.

Vehicle components to be directly heated and optionally cooled may be placed adjacent to or in contact with the electrical heating elements 42, 70 along the top and bottom surfaces of heat exchanger 112, which may or may not be enclosed within a housing (not shown). In addition, the heat exchanger 112 may be used for indirect heating of vehicle components remote from the heat exchanger. 112, whether or not the heat exchanger 112 is also used for direct heating.

Figure 10:
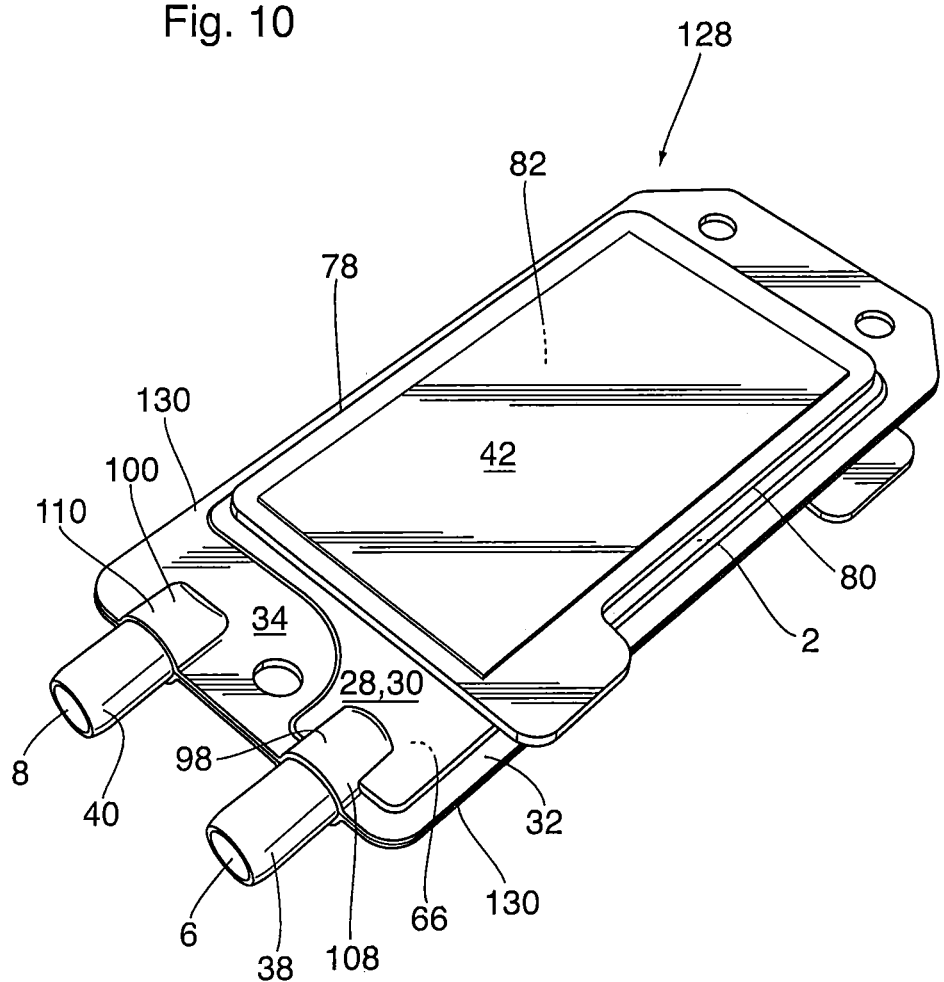
FIG. 10 is a top perspective view of a multi-channel heat exchanger according to a fifth embodiment.
Figure 11:
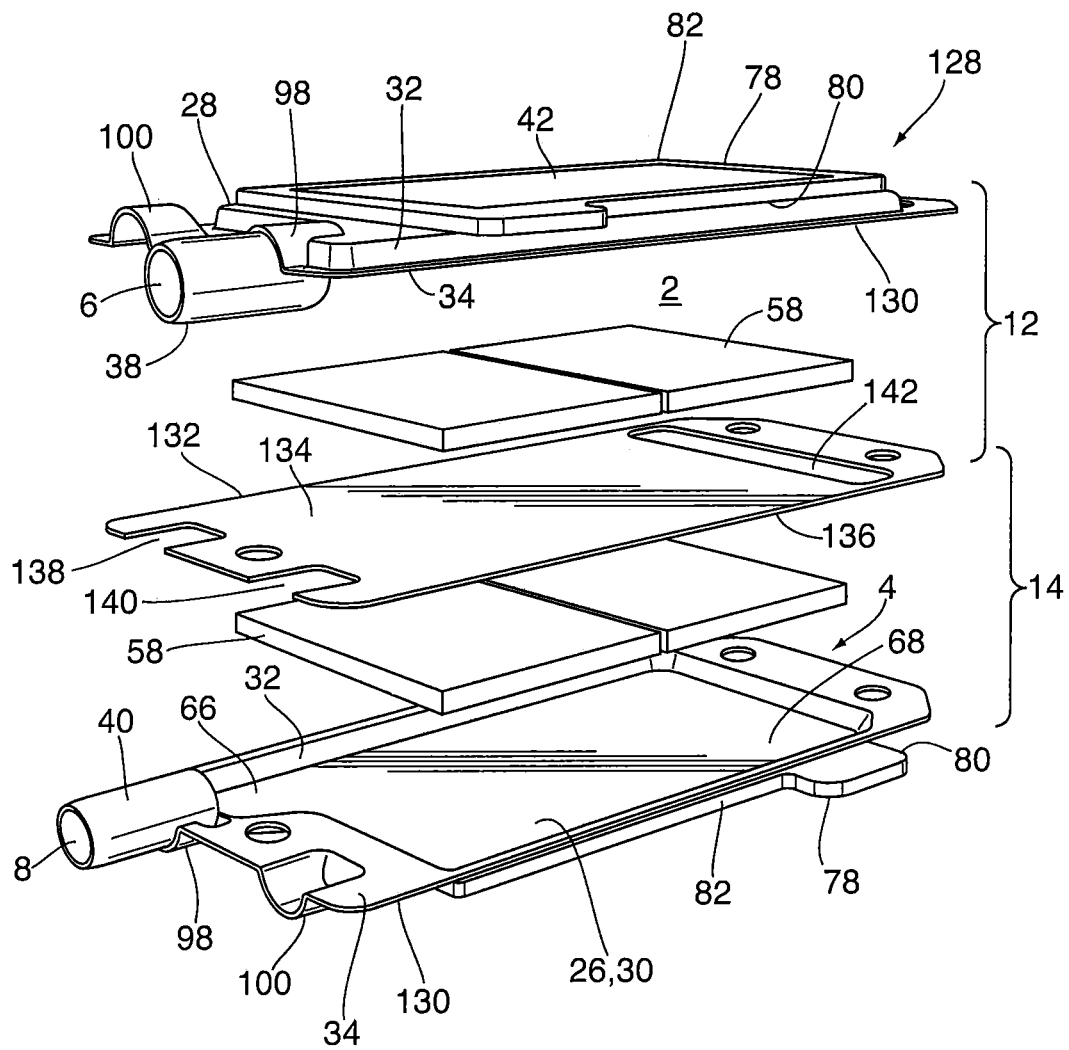
FIG. 11 is a perspective view of the multi-channel heat exchanger of FIG. 10 in a partly disassembled state.

FIGS. 10 and 11 show a multi-channel heat exchanger 128 which is similar to heat exchangers 10, 86, 92, 92' and 112 in a number of respects and in which like reference numerals are used to identify like elements. Unless otherwise indicated, the above description of the like elements of heat exchangers 10, 86, 92, 92' and 112 apply equally to heat exchanger 128, and the following discussion will focus primarily on the ways in which heat exchanger 128 differs from heat exchangers 10, 86, 92, 92' and 112.

Heat exchanger 128 is similar to heat exchangers 10 and 86 in that a two-pass or U-flow configuration is achieved by providing first and second channel structures 12, 14 one on top of the other to provide first and second fluid flow passages 2, 4 which are similarly arranged one on top of the other. However, instead of providing two separate channel structures 12, 14, each comprising two separate plates 18, 24, the heat exchanger 128 comprises two channel structures 12, 14 comprising a total of three plates, two identical outer plates 130 and an intermediate plate 132 separating the first and second channel structures 12, 14 and the first and second fluid flow passages 2, 4 as further described below.

The outer plates 130 are similar to the second plates 24 of the heat exchangers described above and like elements of plates 130 are identified by like reference numerals in the following description. In this regard, each outer plate 130 has inner and outer surfaces 26, 28 and is shaped, for example by stamping or drawing, such that it has a generally flat, planar base 30 surrounded by a raised peripheral sidewall 32 extending from the base 30 to a planar flange 34 defining a sealing surface.

One end of outer plate 130 is provided with a pair of semi-cylindrical socket portions 98, 100, which are also formed by stamping or drawing, the socket portions 98, 100 being spaced apart and located adjacent to opposed corners of outer plate 130. The raised peripheral sidewall 32 and planar flange 34 of outer plate 130 are interrupted adjacent to the corner at which socket portion 98 is located, such that flow communication is provided between socket portion 98 and the base 30 of second plate 24. In contrast, the planar flange 34 is made wider at the corner at which socket portion 100 is provided, such that the socket portion 100 is surrounded along three sides by the planar flange 34, such that socket portion 100 is open at the edge of the outer plate 130, and such that a portion of planar flange 34 is located between socket portion 100 and the base 30 of outer plate 130.

The two outer plates 130 of heat exchanger 128 are arranged in face-to-face opposed relation to one another, such that socket portions 98 and 100 in the opposed outer plates 130 combine to form first and second cylindrical sockets 108, 110. Tubular fittings 38, 40 are sealingly received inside first and second sockets 108, 110, for example by brazing or welding, the fittings 38, 40 projecting outwardly from the edge of the heat exchanger 128 along the x-axis, and parallel to the plane of the plates 130, 132. Either fitting 38, 40 may serve as the inlet or outlet. Although the heat exchanger 128 is described herein as having side entry fittings 38, 40, it will be appreciated that the fittings 38, 40 may instead project from the outer plates 130 (along the y-axis) on opposite sides of heat exchanger 128.

The intermediate plate 132 is flat and has a first side 134 and a second side 136. The intermediate plate 132 is sandwiched between the two outer plates 130, such that one of the outer plates 130 has the sealing surface of its planar flange 34 sealed to the first side 134 of intermediate plate 132, and the other plate 130 has the sealing surface of its planar flange 34 sealed to the second side 136 of intermediate plate 136. The intermediate plate 132 separates the first channel structure 12 from the second channel structure 14 and the first fluid flow passage 2 from the second fluid flow passage 4.

The first fluid flow passage 2 extends between the inner surface 26 of one outer plate 130 and first side 134 of the intermediate plate 132, throughout the area of base 30 of plate 130. The first fluid flow passage 2 is in flow communication with inlet fitting 38 and first cylindrical socket 108.

Similarly, the second fluid flow passage 4 extends between the inner surface 26 of the other outer plate 130 and second side 136 of the intermediate plate 132, throughout the area of base 30 of plate 130. The second fluid flow passage 2 is in flow communication with outlet fitting 40 and second cylindrical socket 110.

At the end of the intermediate plate 132 located proximate to the first and second cylindrical sockets 108, 110, the intermediate plate 132 is provided with notches 138, 140 which are sized and shaped to be slightly larger than the area occupied by the socket portion 100, such that the area of intermediate plate 132 immediately surrounding each of the notches 94, 96 will seal to the portions of planar flange 34 immediately surrounding each of the socket portions 100. This blocks flow communication between the socket portion 100 and the adjacent first or second fluid flow passage 2 or 4.

The other end of the intermediate plate 132, i.e. opposite from the end at which notches 138, 140 are located, is provided with a communication opening 142. The communication opening 142 may comprise a plurality of discrete openings or a continuous slot (as shown), and extends width-wise across the intermediate plate 132 to permit fluid flow from the first fluid flow passage 2 to the second fluid flow passage 4 at the end of heat exchanger 128 which is remote from the inlet and outlet fittings 38, 40. The communication opening 142 is surrounded along its entire perimeter by intermediate plate 132.

In operation, the fluid enters the first fluid flow passage 2 through inlet fitting 38 and first cylindrical socket 108 and flows toward the communication opening 142 of the intermediate plate 132. The fluid flows through the communication opening 142 into the second fluid flow passage 4 and then flows toward the outlet fitting 40 and second cylindrical socket 110.

Each fluid flow passage 2, 4 of heat exchanger 128 is provided with a turbulence-enhancing insert 58 in the form of a corrugated fin or turbulizer, or with elongate ribs 88A extending lengthwise through the flow passages 2, 4. In the present embodiment each fluid flow passage 2, 4 is provided with a turbulence-enhancing insert 58 arranged in the LPD orientation, comprising a corrugated fin with ridges 60 extending lengthwise through the fluid flow passage 2, 4. As in the embodiments described above, a first manifold space 66 may be provided between an edge of each turbulence-enhancing insert 58 and the inlet or outlet fitting 38, 40, and a second manifold space 68 may be provided between the opposite edge of the turbulence-enhancing insert 58 and the raised peripheral sidewall 32 of the outer plate 170, aligned with and in flow communication with the communication opening 142, wherein the manifold spaces 66, 68 provide fluid distribution across the widths of fluid flow passages 2, 4 as in the above-described embodiments. The ridges 60 of each turbulence-enhancing insert 58 may be metallurgically bonded to at least the inner surfaces 26 of the outer plates 130, as by brazing or welding, and may optionally be metallurgically bonded to one of the sides 134 or 136 of the intermediate plate 132 so as to provide enhanced heat transfer.

The heat exchanger 128 is provided with first and second electrical heating elements 42, 70 as described above, provided adjacent to the outer surfaces 28 of both outer plates 130. However, instead of having electrical heating elements 42, 70 which are applied directly to the outer surfaces 28 of outer plates 170, with the dielectric base layer 44 in direct contact with and adhered to outer surface 28 of each outer plate 130, heat exchanger 128 has intermediate heat sink plates 78 to which the first and second electrical heating elements 42, 70 are applied.

Each heat sink plate 78 comprises a flat plate which may be thicker than the outer and intermediate plates 130, 132, having an inner surface 80 which is fixed to the outer surface 28 of the outer plate 130, and an outer surface 82 to which the first or second electrical heating element 42 or 70 is applied, for example by screen printing, and thermally bonded. The heat sink plate 78 may be fixed to the outer plate 130 by a metallurgical bond such as a braze joint or a weld joint, so as to maximize heat transfer through the heat sink plate 78, from the electrical heating element 42 or 70 to the outer plate 130 and to the fluid in fluid flow passage 2 or 4.

Instead of having first and second electrical heating elements 42 and 70 and heat sink plates 78 applied to both outer plates 130, it will be appreciated that heat exchanger 128 may instead have a single electrical heating element 42 applied to a single heat sink plate 78.

Vehicle components to be directly heated and optionally cooled may be placed adjacent to or in contact with one or both of the electrical heating elements 42, 70 along the top and bottom surfaces of heat exchanger 128, which may or may not be enclosed within a housing (not shown). In addition, the heat exchanger 128 may be used for indirect heating of vehicle components remote from the heat exchanger 128, whether or not the heat exchanger 128 is also used for direct heating.

Heat exchanger 128 can be manufactured by first assembling all components of heat exchanger 128 other than electrical heating elements 42 and/or 70 (including outer plates 130, intermediate plate 132, turbulence-enhancing insert 58, heat sink(s) 78, and fittings 38, 40), followed by direct application of the electrical heating elements 42 and/or 70 to the outer surface(s) 82 of heat sink plate(s) 78 in the manner described above.

Alternatively, heat exchanger 128 can be manufactured by: (1) pre-assembling the components of heat exchanger 128 other than electrical heating elements 42 and/or 70 and heat sink plates 78 (including outer plates 130, intermediate plate 132, turbulence-enhancing insert 58, and fittings 38, 40); (2) directly applying the electrical heating elements 42 and/or 70 to the outer surface(s) 82 of heat sink plate(s) 78 in the manner described above; and (3) attaching the heat sink plate(s) 78 with the attached electrical heating elements 42 and/or 70 to the outer surface(s) 28 of the outer plate(s) 130, such that the inner surface(s) 80 of the heat sink plate(s) 78 is/are metallurgically bonded to the outer surface(s) 28 of the outer plate(s) 130, for example by welding.

The heat exchangers according to the above-described embodiments each include two fluid flow passages 2 and 4 provided in either a single channel structure or in multiple channel structures 12, 14. The inventors have discovered that the provision of multiple fluid flow passages provides a lower pressure drop through the heat exchangers as described herein, as compared to a heat exchanger of comparable heating capacity having a single channel structure with a single fluid flow passage. Thus, the heat exchangers as described herein would be expected to create lower parasitic losses than comparable heat exchangers with higher pressure drop.

Figure 12:
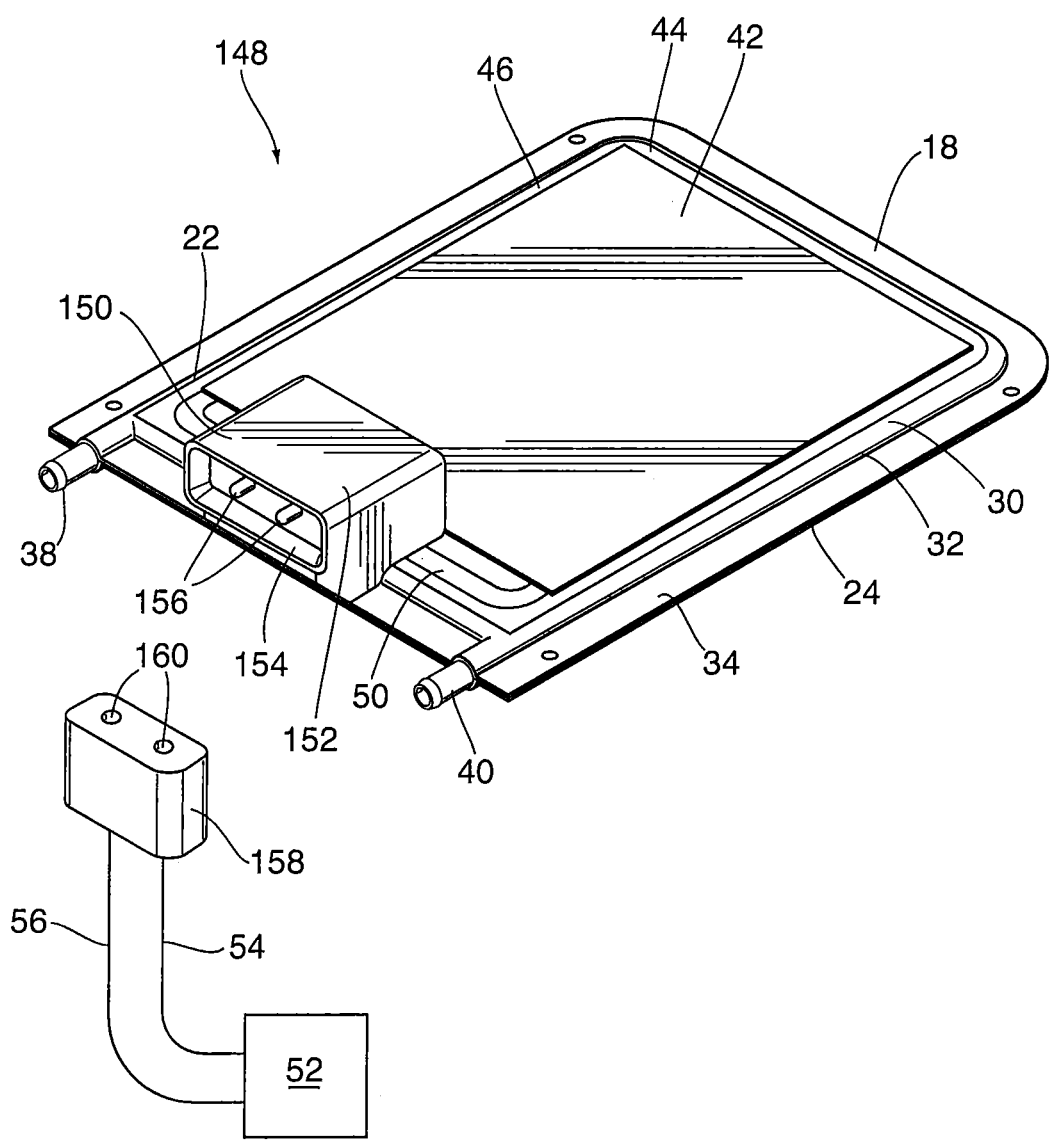
FIG. 12 is a perspective view of a heat exchanger according to a sixth embodiment.

FIG. 12 illustrates a heat exchanger 148 according to a sixth embodiment, which is similar to the heat exchangers described above in a number of respects and in which like reference numerals are used to identify like elements. Unless otherwise indicated, the above description of the like elements applies equally to heat exchanger 148.

Heat exchanger 148 includes a first plate 18 and a second plate 24, wherein both plates 18 and 24 are shaped by stamping or drawing, and both have a planar base 30, raised peripheral sidewall 32 and planar flange 34, although only the features of the first plate 18 are visible in FIG. 12. The outer surface 22 of first plate 18 is provided with an electrical heating element 42, of which the dielectric base layer 44, resistive heater layer 46 and conductive layer 50 are at least partly visible in FIG. 12.

Heat exchanger 148 further comprises a first electrical connector element 150 comprising a housing 152 with rectangular sides, wherein one side of housing 152 is affixed to the outer surface 22 of first plate 18. The first connector element 150 shown in FIG. 12 is a female connector element having an opening 154 provided with one or more conductive pins 156 protruding therein. The first connector element 150 is adapted to mate with a corresponding second electrical connector element 158 which is directly or indirectly connected to leads 54, 56 which connect the heat exchanger 148 to an electrical power supply 52. The second connector element 158 is a male connector element having at least one hole 160 for receiving one of the pins 154. In heat exchanger 148, there are two holes 160 and two pins 156, one for each of the electrical leads 54, 56.

The first connector element 150 is mounted to the first plate 18 such that the conductive pins 156 are electrically connected through the interior of the first connector element 150 to the electrically conductive layer 50 comprising one or more conductive strips/buss bars. In this way, the first and second electrical connector elements 150, 158 combine to provide a secure electrical connection between the electrical heating element 42 and the electrical power supply 52.

Figure 13:
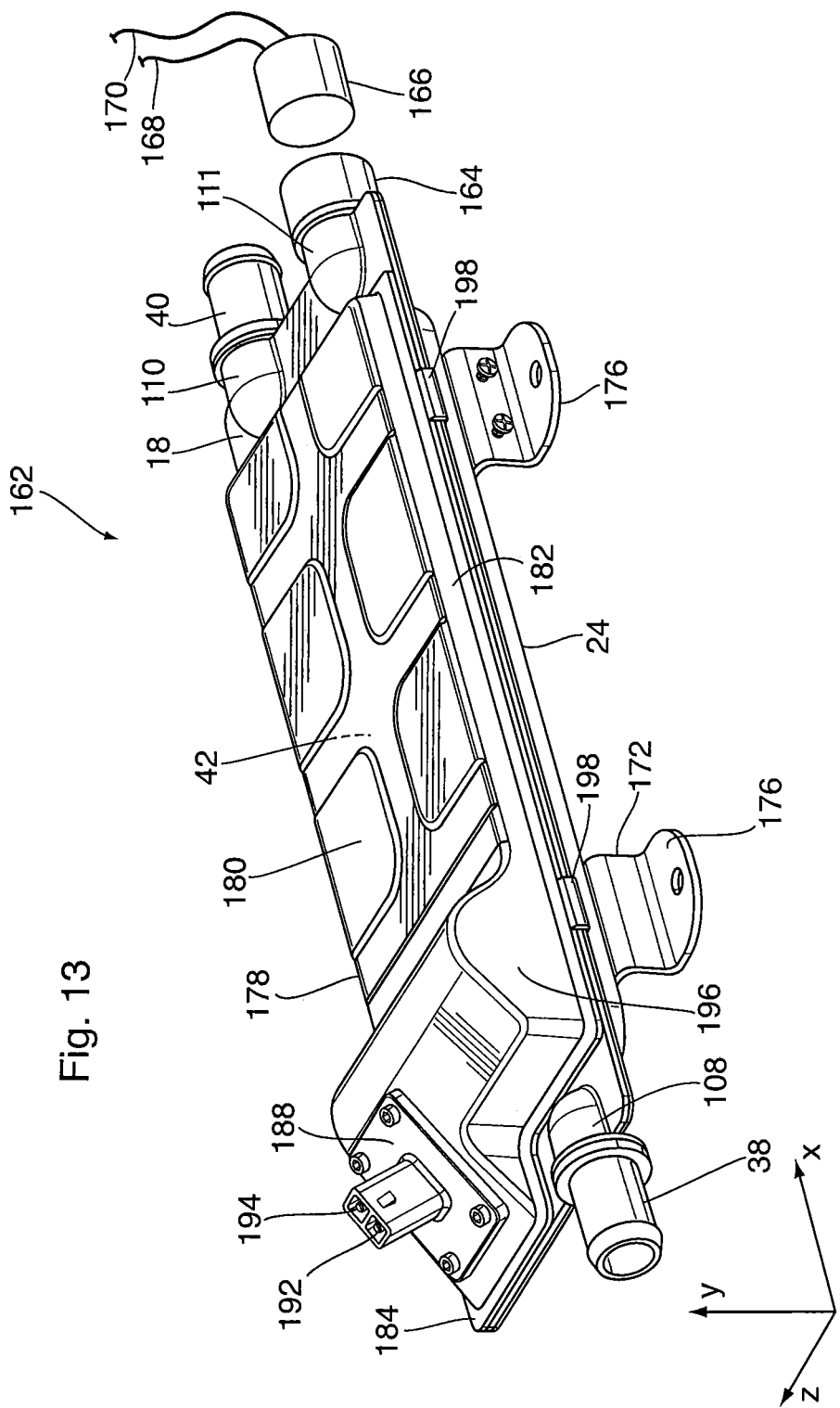
FIG. 13 is a perspective view of a heat exchanger according to a seventh embodiment.
Figure 14:
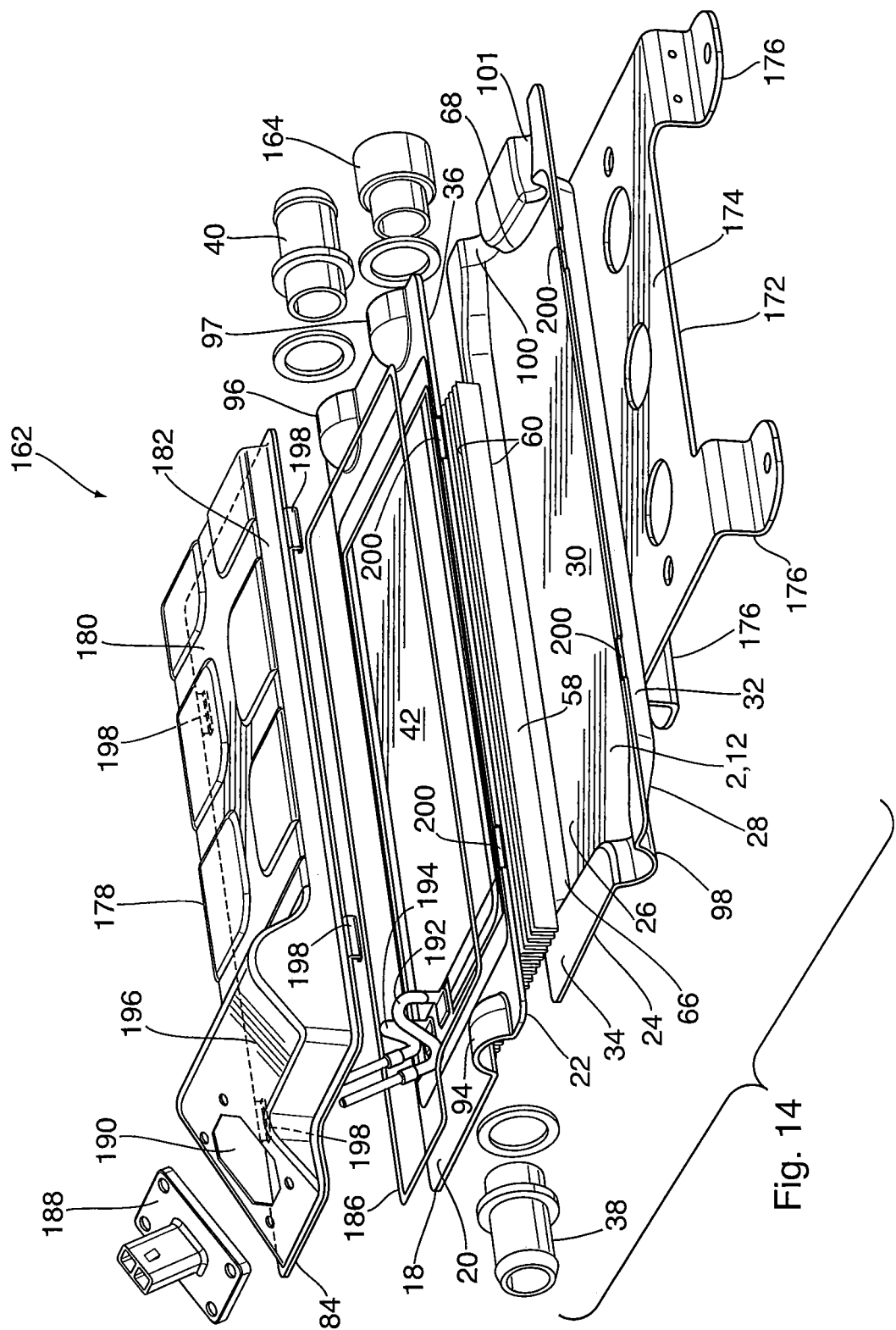
FIG. 14 is an exploded perspective view of the heat exchanger of FIG. 13.

FIGS. 13-14 illustrate a heat exchanger 162 according to a seventh embodiment, which has a number of similarities to the heat exchangers described above, and in which like reference numerals are used to identify like elements. Unless otherwise indicated, the above description of the like elements applies equally to heat exchanger 162.

Heat exchanger 162 includes a first plate 18 and a second plate 24, wherein both plates 18 and 24 are shaped by stamping or drawing. The first plate 18 is flat and planar, with the exception of socket portions 94, 96 and 97, which are provided for reasons which are discussed below. The second plate 24 is shaped to have a generally flat, planar base 30 surrounded on all sides by a raised peripheral sidewall 32 extending from the base 30 to a planar flange 34 defining a sealing surface along which the planar flange 34 is sealed to a planar, peripheral sealing surface 36 on the inner surface 20 of first plate 18, for example by brazing or welding. The raised peripheral sidewall 32 and planar flange 34 are interrupted by socket portions 98, 100, 101 which are also formed by stamping or drawing.

A single channel structure 12 with a first fluid flow passage 2 is defined between the first and second plates 18, 24, and extends longitudinally (along axis x). The socket portions 94, 96, 98 and 100 each have a semi-cylindrical shape, at least proximate to the edges of the plates 18, 24. When the plates 18, 24 are joined together, socket portions 94, 98 combine to form a first cylindrical socket 108 providing flow communication with a first end of the fluid flow passage 2, and socket portions 96, 100 combine to form a second cylindrical socket 110 providing flow communication with a second end of the fluid flow passage 2. Tubular fittings 38, 40 are sealingly received inside first and second sockets 108, 110, for example by brazing or welding, the fittings 38, 40 projecting outwardly from the edge of the heat exchanger 162 along the x-axis, and parallel to the plane of the plates 18, 24. Either fitting 38 or 40 may serve as the inlet or outlet.

The socket portions 97, 101 also have a semi-cylindrical shape proximate to the edges of plates 18, 24. When the plates 18, 24 are joined together, socket portions 97, 101 combine to form a third cylindrical socket 111 providing flow communication with the second end of the fluid flow passage 2. Tubular fitting 164 is sealingly received inside third socket 111, for example by brazing or welding, the fitting 164 projecting outwardly from the edge of the heat exchanger 162 along the x-axis, and parallel to the plane of the plates 18, 24. The third socket 111 and fitting 164. A temperature sensor 166 for sensing the temperature of the heat transfer fluid inside fluid flow passage 2, near the second socket 110. The temperature sensor 166 has electrical leads 168, 170 by which it is adapted for connection to a controller, which may control the operation of the electrical heating element 42 and/or a bypass valve elsewhere in the heating/cooling system.

The fluid flow passage 2 is provided with a turbulence-enhancing insert 58 in the form of a corrugated fin with ridges 60 extending lengthwise (along the x-axis) through the fluid flow passage 2. A first manifold space 66 is provided between an edge of turbulence-enhancing insert 58 and fitting 38, at the first end of fluid flow passage 2, and a second manifold space 68 is provided between an opposite edge of the turbulence-enhancing insert 58 and fitting 40, at the second end of fluid flow passage 2.

The heat exchanger 162 includes an electrical heating element 42 applied directly to the outer surface 22 of first plate 18, the heating element 42 having the structure described above, and being connected to an electrical power supply by electrical leads (not shown), as described above.

The heat exchanger 162 includes a mounting bracket 172 comprising a flat plate portion 174 which is adapted to be secured to the outer surface 28 of second plate 24, for example by brazing or welding, and a plurality of legs 176 for mounting the heat exchanger 162 to a mounting surface of the vehicle. The heat exchanger 162 according to the present embodiment is adapted to be remotely located from the component(s) to be heated, with the heat transfer fluid heated by electrical heating element 42 and being circulated to the component(s) to be heated, located elsewhere in the heating/cooling system. Thus, heat exchanger 162 is specifically adapted for use as a fluid heater to provide indirect heating of one or more vehicle components, in contrast to certain other embodiments described herein in which vehicle components to be heated and optionally cooled are placed adjacent to or in contact with the electrical heating element 42.

As there are no components to be heated in direct contact with the electrical heating element 42, and because heat exchanger 162 lacks a protective second channel as in heat exchanger 10, a protective cover 178 may be provided over the electrical heating element 42 to prevent it from being physical damage, dust and water. The cover 178 may be formed from a lightweight material. For example, the cover 178 may comprise a sheet of lightweight metal such as aluminum, which is shaped by stamping or drawing.

The cover 178 has a top 180, a sidewall 182 extending downwardly from top 180 and terminating in a planar peripheral bottom flange 184. The bottom flange 184 is shaped and sized to completely surround the electrical heating element 42. The bottom flange 184 has a bottom sealing surface which is adapted to be sealed to the outer surface 22 of first plate 18, around the outer periphery of the electrical heating element 42. The cover 178 may be sealed to first plate 18, for example by a resilient sealing gasket 186 provided between the bottom flange 184 and the outer surface 22 of first plate 18, with the top 180 of cover 178 being spaced from the electrical heating element 42.

The cover 178 further comprises a high voltage connector 188 to enable the electrical heating element 42 to be connected to a power source and a controller, such as a battery control module. The high voltage connector 188 may be mounted over a hole 190 in the cover, the hole permitting high voltage leads 192, 194 of electrical heating element 42 to pass through the cover 178 to connector 188. In the present invention, the cover 178 is provided in a raised portion 196 in which the height of the top 180 is increased to accommodate the high voltage leads 192, 194. It will be appreciated, however, that raised portion 196 may not be required in all embodiments, and depends on the specific application.

During manufacture, the electrical heating element 42 is applied to a brazed structure comprising first and second plates 18, 24; fittings 38, 40, 164; and mounting bracket 172. After application of the heating element 42 to first plate 18, the cover 178 is mechanically secured to one or more other components of the heat exchanger 162. In the present embodiment, the cover 178 is provided with a plurality of foldable tabs 198, wherein each of the tabs 198 has one edge secured to the bottom flange 184, and with the tabs 198 optionally being integrally formed with the remainder of cover 178. The cover 178 is secured to the remainder of heat exchanger by folding the tabs 198 downwardly and inwardly. For example, in the present embodiment, the first and second plates 18, 24 are both provided with a plurality of notches 200 in their outer peripheral edges, the notches 200 corresponding in number and location to tabs 198, so as to help locate the cover 178 on the outer surface 22 of first plate 18.

Any of the heat exchangers described herein may be provided with electrical connectors comprising first and second connector elements 150, 158 as described above.

While various embodiments have been described in connection with the present disclosure, it will be understood that certain adaptations and modifications of the described exemplary embodiments can be made as construed within the scope of the present disclosure. Therefore, the above discussed embodiments are considered to be illustrative and not restrictive.

What is claimed is:

1. A heat exchanger having an inlet and an outlet, comprising:
   (a) a first channel structure defining a first fluid flow passage, wherein said first channel structure comprises a first plate, a second plate and a first fluid flow passage; wherein the first fluid flow passage is defined by a space between the inner surfaces of the first and second plates;
   wherein the first and second plates are comprised of aluminum; and
   wherein each of the first and second plates has an inner surface facing inwardly toward the first fluid flow passage, and an opposed exterior surface facing outwardly away from the first fluid flow passage;
   (b) a first electrical heating element comprising:
      an electrically insulating dielectric base layer applied directly to the exterior surface of the first plate and bonded to the exterior surface via application of heat, such that heat produced by the first electrical heating element is transferred through the first plate to the fluid in the first fluid flow passage during use of the heat exchanger, and
      an electrically resistive heater layer positioned in direct face sharing contact with a first side of the dielectric base layer directly opposite a second side of the dielectric base layer, wherein the second side of the dielectric base layer is in face sharing contact with the first plate;
      wherein the first electrical heating element has a thickness from 1 µm to 1000 µm; and
      wherein the dielectric base layer comprises a thermally conductive, electrically insulating composite layer comprising a polymer mixed with a particulate filler material; and
   (c) a protective cover having a top which is spaced from the first electrical heating element, and a bottom flange by which the cover is sealed to the outer surface of the first plate, around the outer periphery of the first electrical heating element.

2. The heat exchanger of claim 1, wherein at least one of the first plate and the second plate comprises a shaped plate having a generally flat, planar base surrounded on all sides by a raised peripheral sidewall having a planar flange defining a sealing surface along which the raised peripheral flange is sealingly secured to the opposing one of the first and second plates.

3. The heat exchanger of claim 2, wherein the first plate is substantially completely flat and the second plate comprises said shaped plate.

4. The heat exchanger of claim 1, further comprising a turbulence-enhancing insert provided in the first fluid flow passage of the first channel structure, the turbulence-enhancing insert comprising a corrugated fin or a turbulizer having ridges connected by side walls, wherein a first plurality of said ridges is in contact with and metallurgically bonded to the inner surface of the first plate.

5. The heat exchanger of claim 1, further comprising at least one heat sink plate having an inner surface which is fixed to the outer surface of the first plate by a metallurgical bond, and an outer surface to which the first electrical heating element is directly applied with the dielectric base layer of the first electrical heating element in direct contact with and thermally bonded directly to the outer surface of the heat sink plate.

6. The heat exchanger of claim 1, wherein the second plate comprises a shaped plate having a generally flat, planar base surrounded on all sides by a raised peripheral sidewall having a planar flange defining a sealing surface along which the raised peripheral flange is sealingly secured to the first plate;
   wherein the second plate has a plurality of protrusions formed in the flat, planar base thereof, the protrusions having a height which is the same as a height of the raised peripheral flange, each said protrusion having a sealing surface which is co-planar with the planar sealing surface of the peripheral flange;

wherein the sealing surfaces of the protrusions are metallurgically bonded to the inner surface of the first plate; and wherein the protrusions comprise ribs and/or dimples.

7. The heat exchanger of claim 1, wherein the space between the inner surfaces of the first and second plates further defines a second fluid flow passage;

wherein the inlet is in flow communication with the first fluid flow passage, and the outlet is in flow communication with the second fluid flow passage, the inlet and outlet being spaced apart from one another and located along a first edge of the heat exchanger;

wherein the first and second fluid flow passages are separated from one another by a first dividing rib, with communication between the first and second flow passages being provided at a gap located at a terminal end of the first dividing rib, said gap being located proximate to a second edge of the heat exchanger, so as to provide a U-flow configuration through the first and second fluid flow passages.

8. The heat exchanger of claim 7, further comprising a second electrical heating element located outside the first and second fluid flow passages and adjacent to the outer surface of the second plate of the first channel structure, such that heat produced by the second electrical heating element is transferred through the first plate of the first channel structure to the fluid in the first and second fluid flow passages during use of the heat exchanger;

wherein the second electrical heating element has a thickness from 1 µm to 1000 µm;

wherein the second electrical heating element comprises an electrically insulating dielectric base layer which is closest to the outer surface of the second plate, and an electrically resistive heater layer on the dielectric layer; and wherein the dielectric base layer comprises a thermally conductive, electrically insulating composite layer comprising a polymer mixed with a particulate filler material.

9. The heat exchanger according to claim 7, wherein at least one of the first electrical heating element and the second electrical heating element has a flat outer surface adapted for thermal contact with one or more vehicle components, for direct heating of the one or more vehicle components, and wherein the flat outer surface of at least one of the first electrical heating element and the second electrical heating element is adapted to support said one or more vehicle components; and wherein said one or more vehicle components comprise one or more battery cells or battery modules of a rechargeable lithium-ion battery for a vehicle.

10. The heat exchanger of claim 1, further comprising a second channel structure comprising a first plate, a second plate and a second fluid flow passage;

wherein the second fluid flow passage is defined by a space between the inner surfaces of the first and second plates of the second channel structure;

wherein the first and second plates of the second channel structure are comprised of aluminum; and wherein each of the first and second plates of the second channel structure has an inner surface facing inwardly toward the second fluid flow passage, and an opposed outer surface facing outwardly away from the second fluid flow passage;

wherein the outer surface of the second plate of the first channel structure is secured to the outer surface of the second plate of the second channel structure;

wherein the inlet is in flow communication with the first fluid flow passage, and the outlet is in flow communication with the second fluid flow passage, and the inlet and outlet are located proximate to a first edge of the heat exchanger;

wherein a communication opening is provided through the second plates proximate to a second edge of the heat exchanger which is remote from the first edge, the communication opening providing flow communication between the first and second fluid flow passages.

11. The heat exchanger of claim 10, wherein the second plate of the first channel structure is integrally formed with the second plate of the second channel structure.

12. The heat exchanger of claim 10, further comprising a second electrical heating element located outside the first and second fluid flow passages and adjacent to the outer surface of the first plate of the second channel structure, such that heat produced by the second electrical heating element is transferred through the first plate of the second channel structure to the fluid in the second fluid flow passage during use of the heat exchanger;

wherein the second electrical heating element has a thickness from about 1 µm to about 1000 µm;

wherein the second electrical heating element comprises an electrically insulating dielectric base layer which is closest to the outer surface of the second plate, and an electrically resistive heater layer on the dielectric layer; and wherein the dielectric base layer comprises a thermally conductive, electrically insulating composite layer comprising a polymer mixed with a particulate filler material.

13. The heat exchanger of claim 10, wherein the first and second channel structures each comprise:

a shaped first plate having a generally flat, planar base surrounded on all sides by a raised peripheral sidewall having a planar flange defining a sealing surface along which the raised peripheral flange is sealingly secured to a sealing surface of the opposed second plate; and a substantially completely flat second plate.

14. The heat exchanger according to claim 1, wherein the heat exchanger comprises a fluid heater for indirect heating of one or more vehicle components which are remote from the heat exchanger, and wherein each of the first and second electrical heating elements further comprises an electrically insulating dielectric top layer which defines the flat outer surface of the electrical heating element.

15. The heat exchanger of claim 1, wherein the dielectric base layer is thermally bonded directly to the exterior surface of the first plate at temperatures below 600° C.

16. The heat exchanger of claim 1, wherein the dielectric base layer maintains a solid structure at temperatures up to 180° C.

17. The heat exchanger of claim 1, wherein the dielectric base layer maintains a solid structure under thermal cycling at temperatures up to 250° C.

18. The heat exchanger of claim 1, wherein the heat exchanger is connected to an electric vehicle and a power supply to the electrical heating element is at least 48 V.

19. The heat exchanger of claim 1, wherein the dielectric base layer is a single layer of material and a first side of the electrically resistive heater layer is in face sharing contact with the first side of the dielectric base layer, the first side of the dielectric base layer opposite the second side directly thermally bonded to the exterior surface of the first plate, and wherein the first side of the electrically resistive heater layer is a surface of the electrically resistive heater layer farthest from the first plate.

20. The heat exchanger of claim 19, wherein a conductive layer is applied to the dielectric base layer and is positioned laterally adjacent to the layer of the electrically resistive heater layer, the conductive layer providing power to the electrically resistive heater layer.

21. The heat exchanger of claim 1, wherein the particulate filler material reduces a difference between a coefficient of thermal expansion of the dielectric base layer and a coefficient of thermal expansion of the aluminum of the first plate.

22. A heat exchanger having an inlet and an outlet, comprising:
   (a) a first channel structure defining a first fluid flow passage, wherein said first channel structure comprises a first outer plate, an intermediate plate, and a first fluid flow passage;
   wherein the first fluid flow passage is defined by a space between the first outer plate and the intermediate plate;
   wherein the first outer plate and the intermediate plate are comprised of aluminum; and
   wherein each of the first outer plate and the intermediate plate has an inner surface facing inwardly toward the first fluid flow passage, and an opposed outer surface facing outwardly away from the first fluid flow passage;
   (b) a first electrical heating element located outside the first fluid flow passage and adjacent to the outer surface of the first outer plate of the first channel structure, such that heat produced by the first electrical heating element is transferred through the first outer plate to the fluid in the first fluid flow passage during use of the heat exchanger;
   (c) a second channel structure defining a second fluid flow passage, wherein said second channel structure comprises the intermediate plate, a second outer plate, and the second fluid flow passage; and
   (d) a second electrical heating element located outside the second fluid flow passage and adjacent to the outer surface of the second outer plate of the second channel structure, such that heat produced by the second electrical heating element is transferred through the second outer plate to the fluid in the second fluid flow passage during use of the heat exchanger;
   wherein the intermediate plate is substantially flat, wherein the first outer plate comprises a first planar flange, wherein a sealing surface of the first planar flange is sealed to a first side of the intermediate plate, wherein the second outer plate comprises a second planar flange, and wherein a second sealing surface of the second planar flange is sealed to a second side of the intermediate plate;
   wherein the first electrical heating element has a thickness from about 1 µm to about 1000 µm;
   wherein the first electrical heating element comprises an electrically insulating dielectric base layer which is closest to the outer surface of the first outer plate, and an electrically resistive heater layer on the dielectric layer;
   wherein a side of the dielectric base layer farthest from the outer surface of the first outer plate is directly in contact with a side of the electrically resistive heater layer that is closest to the outer surface of the first outer plate;
   wherein the dielectric base layer comprises a thermally conductive, electrically insulating composite layer comprising a polymer mixed with a particulate filler material; and
   wherein the dielectric base layer in direct contact with and thermally bonded directly to the outer surface of the first outer plate.

23. A heat exchanger having an inlet and an outlet, comprising:
   (a) a first channel structure defining a first fluid flow passage, wherein said first channel structure comprises a first plate, a second plate and a first fluid flow passage;
   wherein the first fluid flow passage is defined by a space between the inner surfaces of the first and second plates;
   wherein the first and second plates are comprised of aluminum; and
   wherein each of the first and second plates has an inner surface facing inwardly toward the first fluid flow passage, and an opposed exterior surface facing outwardly away from the first fluid flow passage;
   (b) a first electrical heating element comprising:
      an electrically insulating dielectric base layer applied directly to the exterior surface of the first plate and bonded to the exterior surface via application of heat, such that heat produced by the first electrical heating element is transferred through the first plate to the fluid in the first fluid flow passage during use of the heat exchanger, and
      an electrically resistive heater layer positioned in direct face sharing contact with a side of the dielectric layer opposite the first plate;
      wherein the first electrical heating element has a thickness from 1 µm to 1000 µm; and
      wherein the dielectric base layer comprises a thermally conductive, electrically insulating composite layer comprising a polymer mixed with a particulate filler material;
   (c) a second channel structure defining a second fluid flow passage;
   wherein said second channel structure comprises a first plate, a second plate and a second fluid flow passage;
   wherein the second fluid flow passage is defined by a space between the inner surfaces of the first and second plates of the second channel structure;
   wherein the first and second plates of the second channel structure are comprised of aluminum; and
   wherein each of the first and second plates of the second channel structure has an inner surface facing inwardly toward the second fluid flow passage, and an opposed outer surface facing outwardly away from the second fluid flow passage; and
   (d) a second electrical heating element located outside the second fluid flow passage and adjacent to the outer surface of the first plate of the second channel structure, such that heat produced by the second electrical heating element is transferred through the first plate of the second channel structure to the fluid in the second fluid flow passage during use of the heat exchanger;
   wherein the second electrical heating element has a thickness from 1 µm to 1000 µm;
   wherein the second electrical heating element comprises an electrically insulating dielectric base layer which is closest to the outer surface of the second plate, and an electrically resistive heater layer on the dielectric layer;

wherein the dielectric base layer comprises a thermally conductive, electrically insulating composite layer comprising a polymer mixed with a particulate filler material;

wherein the inlet of the heat exchanger is in flow communication with the first fluid flow passage, and the outlet of the heat exchanger is in flow communication with the second fluid flow passage;

wherein the first plate of the first channel structure is in opposed, facing relation to the first plate of the second channel structure, and spaced apart therefrom by a gap;

wherein the first and second electrical heating elements are spaced apart and in opposed, facing relation to one another inside said gap; and wherein the heat exchanger further comprises:
- a first spacer which is received between the first plate of the first channel structure and the first plate of the second channel structure, the first spacer having at least one fluid transfer opening providing flow communication between the first and second fluid flow passages through fluid openings in the first plates of the first and second channel structures which are aligned with the at least one fluid transfer opening of the first spacer;
- the first spacer having first and second surfaces which are sealingly engaged with the first plates of the first and second channel structures; and
- a mechanical sealing element providing a mechanical seal between the first spacer and the first plates of the first and second channel structures.

24. The heat exchanger of claim 23, further comprising a second spacer which is received between the first plate of the first channel structure and the first plate of the second channel structure, the second spacer having first and second surfaces which are engaged with the first plates of the first and second channel structures;
- wherein the second spacer is located along an edge of the heat exchanger along which the inlet and outlet are located;
- wherein the first spacer is located along an opposite edge of the heat exchanger, which is remote from the inlet and the outlet;
- wherein the first and second spacers have a thickness equal to the height of said gap; and
- wherein the first and second electrical heating elements are located with said gap between the first and second spacers.

25. The heat exchanger of claim 24, wherein the second spacer has at least one fluid transfer opening providing flow communication between the second fluid flow passage and the outlet through a fluid opening in the first plate of the first channel structure, and through a fluid opening in the first plate of the second channel structure which is outside the area of the second fluid flow passage; and
- the heat exchanger further comprises a mechanical sealing element providing a mechanical seal between the first spacer and the first plates of the first and second channel structures.

* * * * *